United States Patent
Nakano et al.

(10) Patent No.: US 7,240,972 B2
(45) Date of Patent: Jul. 10, 2007

(54) MAXIMUM ROAD FRICTION FORCE ESTIMATING DEVICE AND BRAKE TORQUE CONTROL DEVICE

(75) Inventors: Keita Nakano, Kariya (JP); Motoshi Suzuki, Nagoya (JP); Hiroaki Niino, Toyota (JP); Masato Yoshino, Kawanishi (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 10/892,294

(22) Filed: Jul. 16, 2004

(65) Prior Publication Data

US 2005/0012386 A1 Jan. 20, 2005

(30) Foreign Application Priority Data

Jul. 17, 2003 (JP) ............................. 2003-198349

(51) Int. Cl.
*B60T 8/60* (2006.01)

(52) U.S. Cl. .................. 303/150; 303/160; 303/175; 303/178; 303/182; 303/183

(58) Field of Classification Search ................ 303/149, 303/150, 160, 175, 177, 178, 182, 183
See application file for complete search history.

(56) References Cited

U.S. PATENT DOCUMENTS

| | | | | |
|---|---|---|---|---|
| 5,513,907 | A | * | 5/1996 | Kiencke et al. ............. 303/150 |
| 5,938,713 | A | * | 8/1999 | Miyazaki ..................... 701/71 |
| 6,266,600 | B1 | * | 7/2001 | Miyazaki ..................... 701/71 |

(Continued)

FOREIGN PATENT DOCUMENTS

DE 195 42 295 A1 5/1997

(Continued)

OTHER PUBLICATIONS

Miyazaki et al., "ABS Control by Measuring of 4 Axis Directional Forces between the Road Surface and Tire—Third Report: Control Algorithm by One-segment Sensing Method Using New Parameter M-", Society of Automotive Engineers of Japan, Inc., Japan, Oct. 1998, pp. 5-8 (Abstract provided), and English language translation is also enclosed.

Primary Examiner—Devon Kramer
(74) Attorney, Agent, or Firm—Buchanan Ingersoll & Rooney PC

(57) ABSTRACT

A brake torque control device obtains inertia torque Tine based upon an equation of motion (Tine=Tw−Ft·Rt) about the rotation of a tire based upon a wheel torque Tw according to a brake torque exerted on the tire, road friction force Ft and a radius Rt of the tire. When the inertia torque Tine exceeds a predetermined reference value, road friction force Ft at this time is set as estimated maximum road friction force Fmax. The instructed brake torque is calculated under the condition that the value that is obtained by adding the predetermined value corresponding to the inertia torque Tine to the torque Fmax·Rt based upon this estimated maximum road friction force Fmax is set as an upper limit value of the instructed brake torque. This allows to clearly set, as one value, the target value of the instructed brake torque upon an ABS control, thereby being capable of more accurately executing the pressure-increasing control and pressure-reducing control of the brake fluid pressure.

11 Claims, 8 Drawing Sheets

U.S. PATENT DOCUMENTS

2001/0035678 A1* 11/2001 Miyazaki .................. 303/150

FOREIGN PATENT DOCUMENTS

| | | |
|---|---|---|
| DE | 197 47 093 A1 | 5/1999 |
| DE | 199 63 135 A1 | 7/2000 |
| EP | 0 630 786 A1 | 12/1994 |
| JP | 2816637 | 8/1998 |
| JP | 2841134 | 10/1998 |
| JP | 11-115722 | 4/1999 |
| JP | 11-334555 | 12/1999 |

* cited by examiner

MAXIMUM ROAD FRICTION FORCE ESTIMATING DEVICE AND BRAKE TORQUE CONTROL DEVICE

BACKGROUND OF THE INVENTION

1. Field of the Invention

The present invention relates to a maximum road friction force estimating device that estimates maximum road friction force which is a maximum value of road friction force caused between a road surface on which a vehicle runs and a tire of the vehicle, and to a brake torque control device utilizing this maximum road friction force estimating device.

2. Description of the Prior Arts

It has generally been well-known that road friction force (road friction coefficient) caused between a road surface on which a vehicle runs and a tire of the vehicle is changed according to a slip ratio (defined as "(vehicle body speed–wheel speed)/(vehicle body speed)" in this specification) of a tire (wheel), and that it is at a maximum when the slip ratio takes some value (for example, values within 5 to 30%) determined by the road surface or the like. Therefore, it is preferable in an ABS (anti-lock brake system) device that brake torque (accordingly, brake fluid pressure) exerted on the tire is controlled so as to keep the slip ratio of the tire to a value by which the maximum road friction force can be demonstrated, in order to achieve the shortest braking distance of the vehicle.

Therefore, an ABS device disclosed in the patent document 1 described below detects road friction force exerted on a tire and brake torque exerted on the tire respectively by a sensor and calculates a differential parameter that is a value according to a value obtained by subtracting the brake torque from the road friction force and that is a value equivalent to an angular acceleration of the tire. This device monitors the value of the differential parameter for determining that the slip ratio of the tire passes the value by which the maximum road friction force can be demonstrated, as it increases or decreases, whereby control for increasing or reducing the brake hydraulic pressure is executed by turns based upon the result of the determination. In other words, the brake torque exerted on the tire is controlled such that the slip ratio of the tire moves within the predetermined range including the value by which the maximum road friction force can be demonstrated.

[Patent Document 1]

Japanese Unexamined Patent Application No. HEI11-115722

However, in the device disclosed above, there may be a case where the slip ratio of the tire falls relatively greatly below the value by which the maximum road friction force can be demonstrated temporarily as a result of the pressure-reducing control of the brake hydraulic pressure, and hence, braking distance becomes long due to the relatively great temporal reduction of the road friction force from the maximum road friction force. Specifically, there is a problem that surplus pressure reduction of the brake hydraulic pressure may be greatly carried out.

This problem can be eliminated if the maximum road friction force that is the maximum value of the road friction force can correctly be estimated. Specifically, if the maximum road friction force can correctly be estimated, pressure-increasing and pressure-reducing controls of the brake hydraulic pressure can be more accurately executed, resulting in that the surplus pressure reduction of the brake hydraulic pressure can be prevented. Accordingly, it has been desired that the maximum road friction force that is the maximum value of the road friction force can correctly be estimated.

SUMMARY OF THE INVENTION

The present invention aims to provide a maximum road friction force estimating device that can precisely estimate maximum road friction force of a road surface on which a vehicle runs and to provide a brake torque control device that can avoid performing a greatly surplus pressure reduction of a brake hydraulic pressure by utilizing this maximum road friction force estimating device.

A maximum road friction force estimating device according to the present invention comprises road friction force obtaining means for obtaining, as road friction force, friction force caused between a road surface on which a vehicle runs and a tire of the vehicle, angular acceleration correspondence value obtaining means for obtaining an angular acceleration correspondence value based upon an angular acceleration of the tire and estimated maximum road friction force setting means for setting the road friction force obtained by the road friction force obtaining means as estimated maximum road friction force when the angular acceleration correspondence value obtained by the angular acceleration correspondence value obtaining means exceeds a predetermined reference value.

The angular acceleration correspondence value based upon the angular acceleration of the tire may be, for example, the angular acceleration itself of the tire or a value (referred to as "inertia torque" in this specification as described later) obtained by multiplying the angular acceleration of the tire by a moment of inertia of the tire (including a wheel to which the tire is mounted). Further, the road friction force obtaining means may be the one in which road friction force is physically detected by a sensor such as a distortion gauge disposed on the axle corresponding to the tire or the one in which road friction coefficient is estimated based upon the value of the acceleration exerted on the vehicle in a front-to-rear direction of the vehicle body and the value of the acceleration in a side-to-side direction of the vehicle body and road friction force is calculated from the estimated road friction coefficient and a load exerted on the tire in the direction vertical to the road surface.

The road friction force of the road surface on which the vehicle runs relatively rapidly increases with the increase in the slip ratio when the slip ratio of the tire is smaller than the value by which the maximum road friction force is demonstrated, while it gently decreases with the increase in the slip ratio when the slip ratio exceeds the value by which the maximum road friction force is demonstrated.

Accordingly, considering a process that the slip ratio of the tire increases with the increase in the (instructed) brake torque (wheel torque described later) exerted on the tire, the road friction force also increases according to the increase in the brake torque by the time when the slip ratio exceeds the value by which the maximum road friction force can be demonstrated. The brake torque here is torque exerted in the direction of decelerating the tire, and the road friction force is force for generating torque exerted in the direction of accelerating the tire. Therefore, a degree that the torque exerted in the direction of decelerating the tire by the brake torque and the torque exerted in the direction of accelerating the tire by the road friction force are offset to each other is great, resulting in that there is no great increase in the inertia torque of the tire.

On the other hand, when the slip ratio of the tire exceeds the value by which the maximum road friction force can be demonstrated, the road friction force does not increase even if the brake torque increases, so that a difference between the torque by the road friction force and the brake torque, i.e., the moment of inertia increases. As a result, the increase in the inertia torque brings the increase in an angular momentum of the tire, thereby relatively rapidly increasing the angular acceleration of the tire. Consequently, the angular acceleration correspondence value also relatively rapidly increases.

From this viewpoint, road friction force obtained at the time when the angular acceleration correspondence value exceeds a predetermined reference value is set as estimated maximum road friction force as the above-mentioned construction, whereby the maximum road friction force of the road surface at this time can accurately be estimated by setting the reference value to a suitable value.

In case where the estimated maximum road friction force is already set, the estimated maximum road friction force setting means is preferably configured to set the obtained road friction force as new estimated maximum road friction force when the obtained road friction force exceeds the set estimated maximum road friction force and/or when the obtained angular acceleration correspondence value exceeds the reference value.

According to this, when the obtained road friction force exceeds the estimated maximum road friction force that is already set, the obtained road friction force is set as new estimated maximum road friction force. Accordingly, in case where the maximum road friction force increases due to a change in the road surface on which the vehicle runs after the estimated maximum road friction force has already been set, the estimated maximum road friction force can suitably be renewed to the maximum road friction force after the increase.

On the other hand, in case where the maximum road friction force decreases due to a change in the road surface on which the vehicle runs after the estimated maximum road friction force has already been set, when the brake torque exerted on the tire increases up to a value that exceeds the value for generating the slip ratio by which the maximum road friction force can be demonstrated after the decrease, the obtained road friction force (value obtained by converting the road friction force into torque) becomes relatively small with respect to the brake torque, so that the angular acceleration correspondence value increases to exceed the reference value, like the above-mentioned case. Therefore, the present invention is configured such that, when the obtained angular acceleration correspondence value exceeds the reference value after the estimated maximum road friction force has already been set, the road friction force obtained at this time is set as new estimated maximum road friction force, whereby, in case where the maximum road friction force decreases due to a change in the road surface or the like, the estimated maximum road friction force can suitably be renewed to the value of the maximum road friction force after the decrease.

The maximum road friction force estimating device of the present invention further comprises body deceleration obtaining means that obtains deceleration exerted on the vehicle in the front-to-rear direction of the vehicle body as a body deceleration, wherein the estimated maximum road friction force setting means is preferably configured to change the reference value according to the obtained body deceleration.

As described above, a slip ratio of a tire by which the maximum road friction force can be demonstrated is relatively a small value in general. Therefore, in case where the slip ratio becomes less than the value by which the maximum road friction force can be demonstrated, the body deceleration that is the deceleration exerted on the vehicle in the front-to-rear direction can be a value approximately proportional to the angular acceleration (accordingly, the angular acceleration correspondence value).

Accordingly, the value of the body deceleration can be a value that should be used as a reference upon setting the reference value that is compared to the angular acceleration correspondence value obtained for accurately judging whether or not the road friction force at present is the maximum road friction force. Therefore, the reference value can easily be set to a suitable value by the configuration wherein the reference value is changed according to the obtained body deceleration as described above.

Further, the maximum road friction force estimating device of the present invention further comprises wheel torque obtaining means that obtains torque generated on an axle corresponding to the above-mentioned tire as wheel torque, wherein the angular acceleration correspondence value obtaining means is preferably configured to calculate the angular acceleration correspondence value based upon the obtained wheel torque and the obtained road friction force.

When brake torque is exerted on a tire, wheel torque corresponding to the brake torque is generated on the axle corresponding to the tire. This means that the wheel torque exerted in the direction for decelerating the tire and the torque based upon the road friction force exerted in the direction for accelerating the tire are exerted on the tire. Therefore, the equation of motion about the rotation of the tire can be represented based upon the wheel torque and the road friction force. Accordingly, the angular acceleration (accordingly, the angular acceleration correspondence value) can accurately be calculated based upon the obtained wheel torque and the obtained road friction force as in the above-mentioned configuration.

In this case, the estimated maximum road friction force setting means is preferably configured to obtain an increasing speed of at least one of the obtained wheel torque and the obtained road friction force and to change the reference value according to the increasing speed.

In case where (instructed) brake torque exerted on a tire rapidly increases due to a rapid brake operation by a driver, for example, wheel torque and road friction force can also rapidly increase with this rapid increase. When there is a response delay in the wheel torque obtaining means or the road friction force obtaining means in such case, an error is likely to occur in the value of the obtained wheel torque or the value of the obtained road friction force by the response delay. As a result, an error is also likely to occur in the angular acceleration correspondence value calculated based upon the wheel torque and the road friction force. For example, in case where the calculated angular acceleration correspondence value is tend to be calculated greater than the actual value, the angular acceleration correspondence value may be misjudged to exceed the reference value, although it does not actually exceed the reference value. Accordingly, it is configured such that the reference value is changed according to at least one increasing speed of the obtained wheel torque and the obtained road friction force, whereby the reference value can be set greater according to the increase in the increasing speed, thereby preventing the aforesaid misjudgment.

Further, the maximum road friction force estimating device of the present invention further comprises wheel angular speed obtaining means that obtains a wheel angular speed of a wheel to which the tire is mounted, wherein the angular acceleration correspondence value obtaining means may be configured to calculate the angular acceleration correspondence value based upon the obtained wheel angular speed.

In general, an ABS system is provided with wheel angular speed obtaining means for obtaining a wheel angular speed of a wheel in most cases. Further, the angular acceleration of a tire is a value obtained by time-differentiating the wheel angular speed of the wheel to which the tire is mounted. Therefore, in case where the wheel angular speed obtaining means is provided, the angular acceleration correspondence value can accurately be calculated even by the configuration in which the angular acceleration correspondence value is calculated based upon the obtained wheel angular speed.

Further, a brake torque control device of the present invention utilizing any one of the maximum road friction force estimating devices comprises brake torque control means that calculates instructed brake torque according to the state of the vehicle and controls an actual brake torque exerted on the tire so as to become the instructed brake torque in order to brake the tire, wherein the brake torque control means is configured to calculate the instructed brake torque under the condition that the value, that is obtained by adding a predetermined value to the value that is obtained by converting the estimated maximum road friction force into torque exerted on the tire, is set as an upper limit value of the instructed brake torque, during when the estimated maximum road friction force is set by the maximum road friction force estimating device.

Here, the brake torque control means may be means for indirectly controlling the brake torque by a control for increasing or decreasing a brake fluid pressure supplied to a wheel cylinder of a wheel, or means for directly controlling the brake torque by electrical means such as a motor or the like.

Considering the balance of the torque, including the above-mentioned inertia torque, exerted on the tire from the equation of motion about the rotation of the tire, the brake torque exerted on the tire at the time when the estimated maximum road friction force is set takes a value obtained by adding the inertia torque to the value that is obtained by converting the estimated maximum road friction force into torque exerted on the tire (specifically, a value obtained by multiplying the estimated maximum road friction force by the radius of the tire).

Accordingly, in case where the (target) brake torque according to the state of the vehicle (for example, brake pedal effort) exceeds the value obtained by adding the inertia torque to the value obtained by converting the estimated maximum road friction force into torque exerted on the tire during when the estimated maximum road friction force is set (renewed) by the maximum road friction estimating device of the present invention, the actual brake torque can be controlled such that the road friction force is kept to be the estimated maximum road friction force by setting the instructed brake torque to be the above-mentioned value obtained by adding the inertia torque.

Specifically, by the configuration wherein the instructed brake torque is calculated under the condition that the value, that is obtained by adding a predetermined value to the value that is obtained by converting the estimated maximum road friction force into torque exerted on the tire, is set as an upper limit value of the instructed brake torque, the upper limit value of the instructed brake torque, i.e., the target value of the instructed brake torque upon executing the ABS control can clearly be set as one value by setting the predetermined value to a suitable value corresponding to the inertia torque. Accordingly, in case where the brake torque is indirectly controlled by pressure-increasing control or pressure-reducing control of the brake fluid pressure, for example, pressure-increasing control or pressure-reducing control of the brake fluid pressure can accurately be executed compared to the above-mentioned conventional device, resulting in being capable of avoiding that the surplus pressure-reduction of the brake fluid pressure is greatly performed.

In this case, the brake torque control device further comprises body deceleration obtaining means for obtaining, as body deceleration, deceleration exerted on the vehicle in the front-to-rear direction, wherein the brake torque control means is preferably configured to change the predetermined value according to the obtained body deceleration.

This can make the time derivative value of the slip ratio of the tire "0", and hence, a control can be made for keeping the slip ratio to the target value (for example, the value at the time when the estimated maximum road friction force is set).

In the brake torque control device of the present invention, the brake torque control means is preferably configured to release the setting of the estimated maximum road friction force by the maximum road friction force estimating device when the value obtained by converting the road friction force, obtained by the road friction force obtaining means in the maximum road friction force estimating device, into torque exerted on the tire is greater than at least one of the calculated instructed brake torque and the obtained wheel torque, and to calculate the instructed brake torque without setting the upper limit value during when the estimated maximum road friction force is not set by the maximum road friction force estimating device.

In case where the state of the road surface is rapidly changed to greatly increase the road friction force (road friction coefficient) in the same slip ratio (for example, in case where wet road surface is changed to dried road surface) after the estimated maximum road friction force is set, there may be the case where the value obtained by converting the road friction force into torque is greater than at least one of the instructed brake torque and the wheel torque.

In case where the state of the road surface is greatly changed as described above, there may be the case where the slip ratio of the tire by which the maximum road friction force of the road surface after the change can be demonstrated is greater than the slip ratio at the time when the estimated maximum road friction force, that is set (renewed) at present, is set. In this case, the estimated maximum road friction force set (renewed) at present is less than the maximum road friction force of the road surface after the change. On the other hand, when the upper limit value of the instructed brake torque is set as described above, the instructed brake torque cannot be set to a value by which road friction force exceeding the estimated maximum road friction force can be demonstrated. As a result, the estimated maximum road friction force cannot reach the maximum road friction force of the road surface after the change, whereby the estimated maximum road friction force is kept to be the value different from (less than) the maximum road friction force of the road surface after the change.

Therefore, by the configuration in which the setting of the estimated maximum road friction force is temporarily released and the instructed brake torque is calculated without setting the upper limit value during when the estimated maximum road friction force is not set, the instructed brake torque can be set to a value by which the maximum road friction force of the road surface after the change can be demonstrated. As a result, when the angular acceleration correspondence value exceeds again the reference value, new estimated maximum road friction force can be set to agree with the maximum road friction force of the road surface after the change.

Further, in the brake torque control device of the present invention, the brake torque control means may be configured to obtain the increasing speed of the calculated instructed brake torque and to change the reference value, that is used by the estimated maximum road friction force setting means of the maximum road friction force estimating device, according to the increasing speed.

As previously explained, in case where the instructed brake torque rapidly increases by the rapid brake operation by a driver, for example, an error is likely to occur in the obtained angular acceleration correspondence value, so that there is a possibility that a misjudgment may occur upon determining which is greater of the angular acceleration correspondence value and the reference value. Therefore, the misjudgment can be prevented like the above-mentioned case by the configuration in which the reference value is changed according to the increasing speed of the calculated instructed brake torque as described above.

DESCRIPTION OF THE PREFERRED EMBODIMENT

Figure 1:
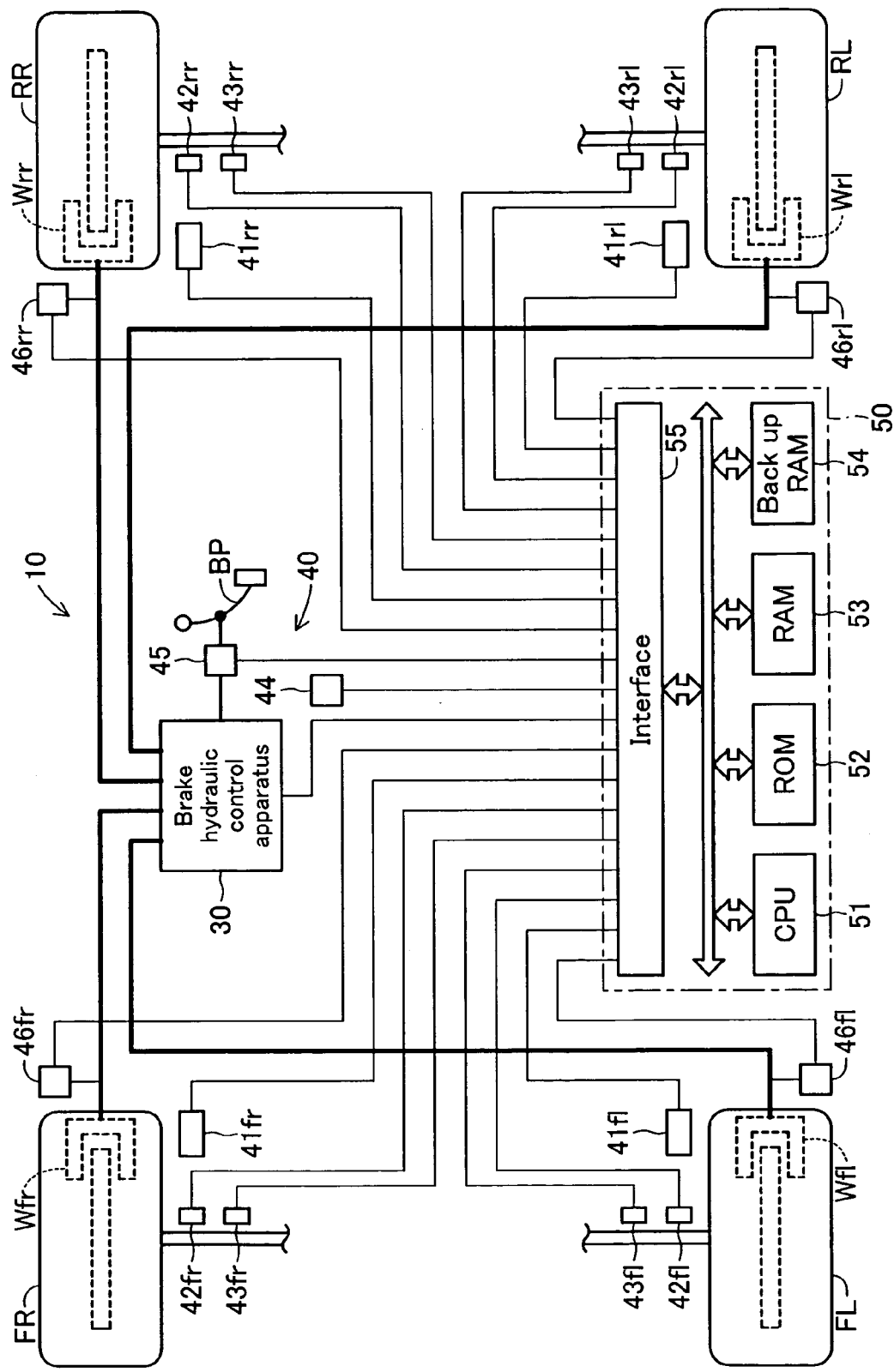
FIG. 1 is a schematic constructional view of a vehicle having mounted thereto a brake torque control device including a maximum road friction force estimating device according to an embodiment of the present invention.

A preferred embodiment of a brake torque control device including a maximum road friction force estimating device according to the present invention will be explained hereinbelow with reference to drawings. FIG. 1 shows a schematic construction of a vehicle provided with a brake torque control device 10 according to the embodiment of the invention. This vehicle is a four-wheel drive vehicle having two front wheels (front-left wheel FL and front-right wheel FR) that are non-driving wheels and two rear wheels (rear-left wheel RL and rear-right wheel RR) that are driving wheels.

The brake torque control device 10 is configured to include a brake hydraulic control apparatus 30 for producing braking force by a brake fluid pressure on each wheel, a sensor section 40 composed of various sensors and an electrical control apparatus 50.

Figure 2:
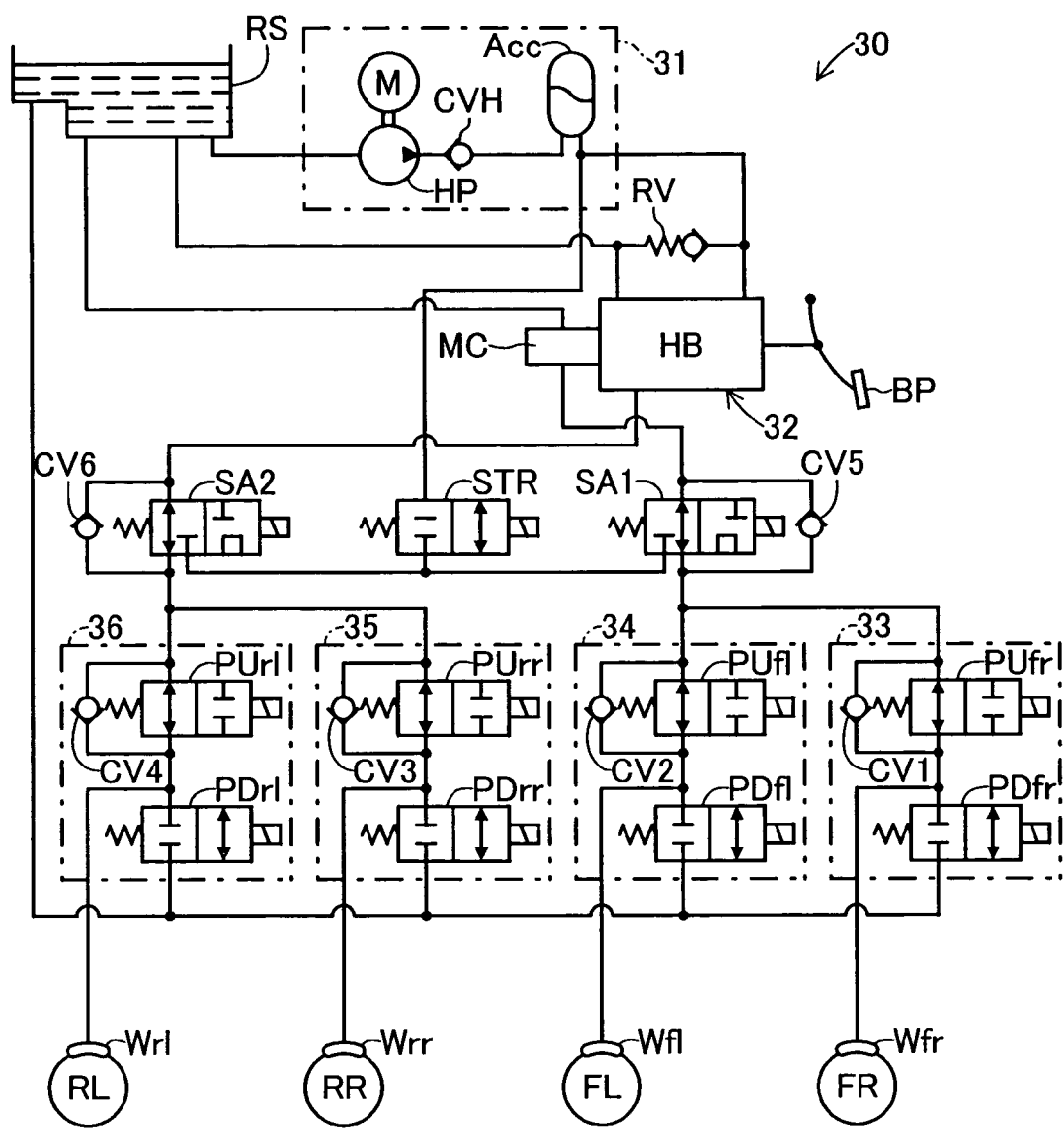
FIG. 2 is a schematic constructional view of a brake hydraulic control device shown in FIG. 1.

The brake hydraulic control apparatus 30 whose construction is schematically shown in FIG. 2 is configured to include a high-pressure generating section 31, a brake fluid pressure generating section 32 that generates brake fluid pressure according to operating force on a brake pedal BP, and an FR brake fluid pressure adjusting section 33, an FL brake fluid pressure adjusting section 34, an RR brake fluid pressure adjusting section 35 and an RL brake fluid pressure adjusting section 36 that are capable of adjusting brake fluid pressure supplied respectively to wheel cylinders Wfr, Wfl, Wrr and Wrl each arranged at each wheel FR, FL, RR and RL.

The high-pressure generating section 31 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 31.

The brake hydraulic generating section 32 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 31 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FR brake fluid pressure adjusting section 33 and the upstream side of the FL brake fluid pressure adjusting section 34. Similarly, a control valve SA2 that is a three-port two-position switching type solenoid-operated valve is arranged between the hydraulic booster HB and each of the upstream side of the RR brake fluid pressure adjusting section 35 and the upstream side of the RL brake fluid pressure adjusting section 36. Further, a change-over valve STR that is a two-port two-position switching type, normally closed, solenoid-operated on-off valve is arranged between the high-pressure generating section 31 and each of the control valve SA1 and the control valve SA2.

When the control valve SA1 is in the first position in FIG. 2 (in the non-actuated position), it functions to establish communication between the master cylinder MC and each of the upstream section of the FR brake fluid pressure adjusting section 33 and the upstream section of the FL brake fluid pressure adjusting section 34. When in the second position (in the actuated position), it functions to cut off the communication between the master cylinder MC and each of the upstream section of the FR brake fluid pressure adjusting section 33 and the upstream section of the FL brake fluid pressure adjusting section 34, but establish the communication between the change-over valve STR and each of the upstream section of the FR brake fluid pressure adjusting section 33 and the upstream section of the FL brake fluid pressure adjusting section 34.

When the control valve SA2 is in the first position in FIG. 2 (in the non-actuated position), it functions to establish communication between the hydraulic booster HB and each of the upstream section of the RR brake fluid pressure adjusting section 35 and the upstream section of the RL brake fluid pressure adjusting section 36. When in the second position (in the actuated position), it functions to cut off the communication between the hydraulic booster HB and each of the upstream section of the RR brake fluid pressure adjusting section 35 and the upstream section of the RL brake fluid pressure adjusting section 36, but establish the communication between the change-over valve STR and each of the upstream section of the RR brake fluid pressure adjusting section 35 and the upstream section of the RL brake fluid pressure adjusting section 36.

By this operation, master cylinder fluid pressure is supplied to each of the upstream section of the FR brake fluid pressure adjusting section 33 and the upstream section of the FL brake fluid pressure adjusting section 34 when the control valve SA1 is placed at the first position, while high pressure generated from the high-pressure generating section 31 is supplied thereto when the control valve SA1 is placed at the second position and the change-over valve STR is placed at the second position (at the actuated position).

Similarly, regulator fluid pressure is supplied to each of the upstream section of the RR brake fluid pressure adjusting section 35 and the upstream section of the RL brake fluid pressure adjusting section 36 when the control valve SA2 is placed at the first position, while high pressure generated from the high-pressure generating section 31 is supplied thereto when the control valve SA2 is placed at the second position and the change-over valve STR is placed at the second position.

The FR brake fluid pressure adjusting section 33 is composed of a pressure increasing valve PUfr that is a two-port two-position switching type, normally opened, solenoid-operated on-off valve and a pressure reducing valve PDfr that is a two-port two-position switching type, normally closed, solenoid-operated on-off valve. The pressure increasing valve PUfr, when placed at the first position in FIG. 2 (at the non-actuated position), establishes a communication between the upstream section of the FR brake fluid pressure adjusting section 33 and the wheel cylinder Wfr, while it cuts off the communication between the upstream section of the FR brake fluid pressure adjusting section 33 and the wheel cylinder Wfr when placed at the second position (at the actuated position). The pressure reducing valve PDfr cuts off the communication between the wheel cylinder Wfr and the reservoir RS when it is placed at the first position in FIG. 2 (at the non-actuated position), while it establishes the communication between the wheel cylinder Wfr and the reservoir RS when placed at the second position (at the actuated position).

By this operation, the brake fluid pressure in the wheel cylinder Wfr is increased when the pressure increasing valve PUfr and the pressure reducing valve PDfr are placed at the first position since the fluid pressure at the upstream section of the FR brake fluid pressure adjusting section 33 is supplied into the wheel cylinder Wfr. When the pressure increasing valve PUfr is placed at the second position and the pressure reducing valve PDfr is placed at the first position, the brake fluid pressure in the wheel cylinder Wfr is kept to be the fluid pressure at the time in the wheel cylinder Wfr regardless of the fluid pressure at the upstream section of the FR brake fluid pressure adjusting section 33. When the pressure increasing valve PUfr and the pressure reducing valve PDfr are placed at the second position, the brake fluid in the wheel cylinder Wfr is returned to the reservoir RS to thereby reduce the fluid pressure.

A check valve CV1 is arranged in parallel to the pressure increasing valve PUfr for allowing only one-way flow of the brake fluid from the wheel cylinder Wfr side to the upstream section of the FR brake fluid pressure adjusting section 33. This arrangement brings a rapid reduction of the brake fluid pressure in the wheel cylinder Wfr when the released brake pedal BP is opened with the control valve SA1 placed at the first position.

Similarly, the FL brake fluid pressure adjusting section 34, RR brake fluid pressure adjusting section 35 and RL brake fluid pressure adjusting section 36 are respectively composed of a pressure increasing valve PUfl and pressure reducing valve PDfl, a pressure increasing valve PUrr and pressure reducing valve PDrr and a pressure increasing valve PUrl and pressure reducing valve PDrl. The position of each pressure increasing valve and pressure reducing valve is controlled, whereby the brake fluid pressure in the wheel cylinder Wfl, wheel cylinder Wrr and wheel cylinder Wrl can be increased, kept and reduced. Further, check valves CV2, CV3 and CV4 that can attain the function same as that of the check valve CV1 are respectively arranged in parallel to the pressure increasing valves PUfl, PUrr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FR brake fluid pressure adjusting section 33 and the FL brake fluid pressure adjusting section 34 is cut off, the brake fluid pressure in the wheel cylinders Wfr and Wfl can be increased by operating the brake pedal BP. Further, arranged in parallel to the control valve SA2 is a check valve CV6 that can attain the function same as that of the check valve CV5.

The brake torque control device having the above-mentioned construction normally keeps all the control valve SA1, change-over valve STR and pressure increasing valve PUfl into the actuated state (i.e., the second position). The brake hydraulic control device 30 controls, independently for every wheel, the brake torque exerted on each wheel such that the actual brake fluid pressure Pw in the wheel cylinder matches to the instructed brake hydraulic pressure Pout according to the instructed brake torque Tout calculated by a CPU 51 described later according to brake pedal effort Fp or the like detected by a later-described pedal effort sensor 45 by respectively controlling the pressure increasing valve PU and pressure reducing valve PD. This allows to control, independently for every wheel, the brake torque exerted on a wheel to become the instructed brake torque Tout.

Further, the brake hydraulic control device 30 brings all solenoid-operated valves into non-actuated state in case where abnormality occurs, whereby the brake fluid pressure Pw according to the effort Fp of the brake pedal BP can be supplied to each wheel cylinder. This allows to achieve a fail-safe function.

Referring again to FIG. 1, the sensor section 40 is composed of wheel speed sensors 41fl, 41fr, 41rl and 41rr each constructed by a rotary encoder that outputs a signal having a pulse every time each wheel FL, FR, RL and RR rotates at a predetermined angle, wheel torque sensors 42fl, 42fr, 42rl and 42rr that are embedded to a predetermined position of the inside of the axle of each wheel for detecting torque generated on each axle as wheel torque and outputting a signal showing each wheel torque of Twfl, Twfr, Twrl and Twrr, road friction force sensors 43fl, 43fr, 43rl and 43rr that are embedded in a predetermined position at the inside of the axle of each wheel and at the inner side of the vehicle body from the corresponding wheel torque sensor 42 for detecting friction force caused between a tire of each wheel and the road surface as road friction force and for outputting a signal showing the road friction forces Ftfl, Ftfr, Ftrl and Ftrr, a body deceleration sensor 44 that detects a deceleration in the front-to-rear direction of the vehicle body as body deceleration and outputs a signal showing the body deceleration dV/dt, a pedal effort sensor 45 that detects an effort of the brake pedal BP by a driver and outputs a signal showing the brake pedal effort Fp and brake hydraulic sensors 46fl, 46fr, 46rl and 46rr that respectively detect brake fluid pressure in the wheel cylinders Wfl, Wfr, Wrl and Wrr of each wheel and output a signal showing the brake fluid pressures Pwfl, Pwfr, Pwrl and Pwrr. It should be noted that the body deceleration dV/dt is a value having a reverse sign of the body acceleration.

The electrical control apparatus 50 is a microcomputer including a CPU 51, a ROM 52 that stores in advance a routine (program) executed by the CPU 51, table (look-up table, map), constant or the like, a RAM 53 to which the CPU 51 temporarily stores data as needed, a back-up RAM 54 that stores data with a power supply turned on and holds the stored data even during a period when the power supply is turned off and an interface 55 including an AD converter, those of which are connected to one another with a bus. The interface 55 is connected to the sensors 41 to 46, thereby supplying to the CPU 51 signals from the sensors 41 to 46 and transmitting a driving signal to each solenoid-operated valve and motor M of the brake hydraulic control device 30 according to the instruction from the CPU 51.

Further, the brake hydraulic control device 30 can execute an automatic brake control, according to the instruction from the CPU 51, such as a well-known traction control, well-known vehicle stability control or the like for exerting predetermined brake torque independently for every wheel regardless of whether the brake pedal BP is operated or not. During when the automatic brake control is executed, the CPU 51 calculates necessary control volume G every wheel and also calculates instructed brake torque Tout based upon the necessary control volume G.

[Outline of Estimating Method of Maximum Road Friction Force]

Figure 3:
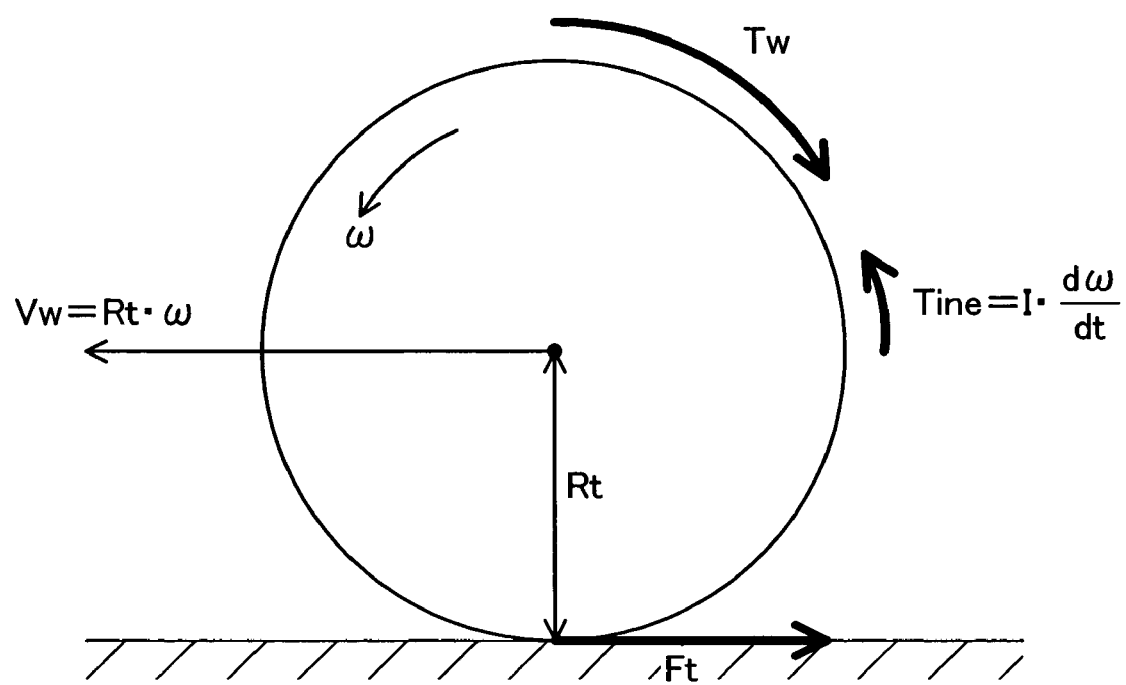
FIG. 3 is a view showing force and torque exerted on a tire upon braking.

Subsequently, an outline of an estimating method of the maximum road friction force will be explained. At first, torque exerted on a tire that is now being braked will be explained with reference to FIG. 3. FIG. 3 is a view showing torque (and force) exerted on a tire having a radius of Rt when brake torque is exerted on the tire in case where the tire travels in the leftward direction in the figure as it rotates in the counterclockwise direction with an angular speed ω. The wheel speed Vw of the wheel to which the tire is mounted is Rt·ω. This wheel speed Vw becomes equal to the advancing speed of the tire when the slip ratio of the tire is "0".

As shown in FIG. 3, exerted on the tire are brake torque (accordingly, wheel torque Tw) exerted in the direction for decelerating the tire (in the clockwise direction) and torque Ft·Rt exerted in the direction for accelerating the tire (in the counterclockwise direction) based upon the road friction force Ft that is generated according to the wheel torque Tw and exerted in the rightward direction in the figure. The wheel torque Tw is a value detected by the wheel torque sensor 42, that becomes the same value as the brake torque exerted on the tire. Further, the road friction force Ft is a value detected by the road friction force sensor 43.

Therefore, the equation of motion about the rotation of this tire (or the equation of balance of the torque exerted on the tire) can be represented by a formula 1 described later.

$$I \cdot d\omega/dt = Tw - Ft \cdot Rt \qquad \text{[Formula 1]}$$

In the above formula 1, I is a moment of inertia of the tire (including the wheel to which the tire is mounted). Further, the angular acceleration dω/dt of the tire is handled with the value in the direction for decelerating the tire (in the clockwise direction) as a positive value. Moreover, as shown in FIG. 3, I·dω/dt is defined as inertia torque Tine. The inertia torque Tine is a value corresponding to the angular acceleration correspondence value.

Figure 4:
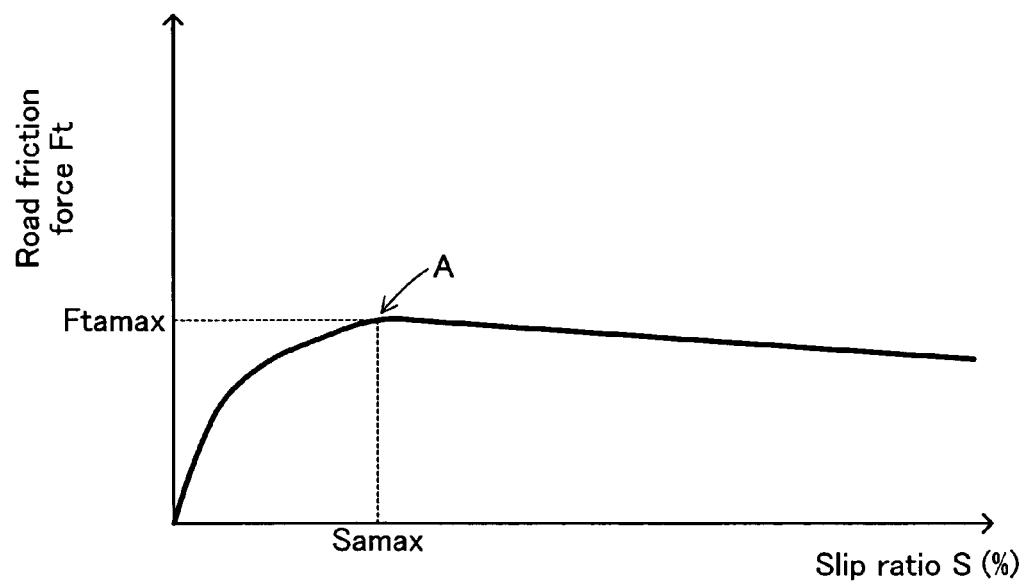
FIG. 4 is a view showing a general relationship between a slip ratio of a tire and road friction force.

As shown in FIG. 4, the road friction force Ft relatively rapidly increases with the increase in the slip ratio S in general when the slip ratio S of the tire is less than a value Samax (a value corresponding to a point A, generally 5 to 30%) by which the maximum road friction force Ftamax can be demonstrated. On the other hand, when the slip ratio S exceeds the value Samax, the road friction force Ft relatively gently decreases with the increase in the slip ratio S.

Therefore, in case where the slip ratio S increases with the increase in the brake torque (accordingly, wheel torque Tw) exerted on the tire, the torque Ft·Rt based upon the road friction force Ft increases according to the increase in the wheel torque Tw by the time when the slip ratio S exceeds the value Samax. Accordingly, the inertia torque Tine cannot be greatly increased since the wheel torque Tw and the torque Ft·Rt based upon the road friction force are offset to each other at this stage as understood from the above formula 1.

On the other hand, when the slip ratio S exceeds the value Samax, the road friction force Ft does not increase (but gradually decreases) even if the wheel torque Tw increases. As a result, the inertia torque Tine relatively rapidly increases as understood from the above formula 1.

From the above, a reference value α is set to a suitable value and the road friction force Ft detected by the road friction force sensor 43 is set to the estimated maximum road friction force Fmax at the time when the inertia torque Tine exceeds the reference value α, whereby the maximum road friction force of the road surface at the time of the setting (Ftamax in FIG. 4) can accurately be estimated as the estimated maximum road friction force Fmax.

Meanwhile, it is a problem which value the reference value α should be set. As previously explained, the slip ratio Samax by which the maximum road friction force can be demonstrated is generally relatively small value, so that in the stage where the slip ratio S is less than the value Samax, the body deceleration speed dV/dt is approximately equal to Rt·dω/dt. Accordingly, the inertia torque Tine (=I·dω/dt) becomes approximately equal to the value obtained by multiplying the value, that is obtained by dividing the body deceleration dv/dt by the tire radius Rt, by the moment of inertia I. Therefore, the value of the body deceleration dV/dt detected by the body speed sensor 44 can be a value that should be used as a reference for setting the reference value α.

Specifically, examples of the reference value α include a value obtained by making a value, that is obtained by multiplying the body deceleration dV/dt by (I/Rt), predetermined integer times (for example, three times) or a value obtained by adding a predetermined constant γ to a value that is obtained by multiplying the body deceleration dV/dt by (I/Rt). The use of such reference value α enables to accurately set the estimated maximum road friction force Fmax with a state wherein adverse affects due to a calculation error of the inertia torque Tine or noise are eliminated.

Further, as described above, the road friction force sensor 43 is embedded in the axle at the position further from the tire than from the wheel torque sensor 42. Accordingly, in case where the brake torque exerted on the tire rapidly increases due to a rapid brake pedal operation by a driver and with this, the wheel torque Tw and the road friction force Ft also rapidly increases, there is a tendency that a response delay occurs greatly in the road friction force sensor 43 than in the wheel torque sensor 42. In this case, the inertial torque Tine calculated from the above formula 1 is calculated somewhat greater than the actual value. Consequently, there is a possibility that the inertial torque may be misjudged to exceed the reference value α although it actually does not exceed the reference value α. Therefore, in order to prevent the misjudgment, the value of the increasing speed dTw/dt of at least one of the wheel torque Tw detected by the wheel torque sensor 42 and the road friction force Ft detected by the road friction force sensor 43 (in this embodiment, only the wheel torque sensor Tw) should be referred to upon setting the reference value α.

From the above, the brake torque control device 10 (hereinafter sometimes referred to as "this device") according to the present embodiment sets one after another the reference value α according to a formula 2 described below independently for every wheel. In the formula 2, a function f is a function that takes a value increasing in accordance with the increase in the body deceleration dV/dt and increasing according to the increase in the increasing speed dTw/dt of the wheel torque Tw.

$$\alpha = f(dV/dt, dTw/dt) \qquad \text{[Formula 2]}$$

When the value of the wheel torque Tw, the value of the road friction force Ft and the value of the inertia torque Tine calculated based upon the above formula 1 exceed the set reference value α, this device sets the value of the road friction force Ft at this point as the estimated maximum road friction force Fmax independently for every wheel. The above description is the outline of the estimating method of the maximum road friction force.

[Renewal of Maximum Road Friction Force]

As described above, there may be the case where the road friction force Ft detected by the road friction force sensor 43 becomes greater than the set estimated maximum road friction force Fmax due to the change in the road surface state even after the estimated maximum road friction force is set. In this case, the estimated maximum road friction force Fmax should be renewed such that the estimated maximum road friction force Fmax becomes equal to the road friction force Ft.

In case where the road friction force Ft becomes greater than the set estimated maximum road friction force Fmax after the estimated maximum road friction force Fmax is set, this device renews the value of the estimated maximum road friction force Fmax by setting the road friction force Ft as new estimated maximum road friction force Fmax.

On the other hand, there may be a case where the maximum road friction force decreases due to the change in the road surface state after the estimated maximum road friction force is set. In this case, the torque Ft·Rt based upon the road friction force Ft becomes relatively small with respect to the wheel torque Tw controlled at this point. As a result, the inertia torque Tine increases to exceed the reference value α like the above-mentioned case.

In case where the value of the inertia torque Tine calculated according to the above formula 1 exceeds the reference value α set according to the above formula 2 after the estimated maximum road friction force Fmax is set, this device sets the value of the road friction force Ft at this point as new estimated maximum road friction force Fmax, thereby renewing the estimated maximum road friction force Fmax.

[Setting Upper Limit Value of Instructed Brake Torque]

Considering the balance of the torque exerted on the tire including the inertia torque Tine based upon the above formula 1, the brake torque (accordingly, wheel torque Tw) exerted on the tire at the time when the estimated maximum road friction force Fmax is set (and renewed) becomes the value obtained by adding the inertia torque Tine (the inertia torque Tine is hereinafter referred to as a predetermined value β) to the torque Fmax·Rt based upon the estimated maximum road friction force Fmax.

Accordingly, after the estimated maximum road friction force Fmax is once set and during when it keeps being renewed, in case where target brake torque Td described later and set according to the brake pedal effort Fp exceeds the value (Fmax·Rt+β), the instructed brake torque Tout is set (limited) to be the same value (Fmax·Rt+β), whereby the actual brake torque (accordingly, wheel torque Tw) exerted on the tire can be controlled such that the road friction force Ft is kept to be the set and renewed estimated maximum road friction force Fmax. Therefore, during when the estimated maximum road friction force Fmax is set (renewed), it is preferable that the instructed brake torque Tout is calculated with the value (Fmax·Rt+β) defined as the upper limit value.

Meanwhile, it is a problem which value the predetermined value β should be set. The slip ratio S of the tire is represented by a formula 3 described below. In the formula 3, V is a body speed (in this embodiment, the maximum value among wheel speeds Vw (=Rt·ω) of each wheel) and ω is the angular speed of the tire.

$$S = (V - Rt \cdot \omega)/V \qquad \text{[Formula 3]}$$

The above formula 3 is rearranged by time-differentiation, to thereby obtain a formula 4 described later. In the formula 4, dV/dt is the body deceleration.

$$d\omega/dt = ((1-S)/Rt) \cdot dV/dt - (V/Rt) \cdot dS/dt \qquad \text{[Formula 4]}$$

Accordingly, controlling the brake torque (i.e., instructed brake torque Tout) so as to be "dω/dt=((1−S)/Rt)·dV/dt" brings the time derivative value of the slip ratio S "dS/dt=0" as can be understood from the above formula 4, resulting in that the slip ratio S can be controlled to keep the target value. It is preferable that the target slip ratio S is set to a slip ratio Sc of the tire at the time when the latest estimated maximum road friction force Fmax is set (renewed) in order to obtain the shortest braking distance.

Therefore, this device sets, one after another independently for every wheel, the predetermined value β, that is the value for the inertia torque Tine (=I·dω/dt), according to a formula 5 described later. In the formula 5, the body deceleration dV/dt is a value detected by the body deceleration sensor 44.

$$\beta = (I/Rt) \cdot (1-Sc) \cdot dV/dt \qquad \text{[Formula 5]}$$

This device sets, independently for every wheel, the brake pedal effort Fp and the target brake torque Td based upon the necessary control volume G for executing the automatic brake control, and during when the estimated maximum road friction force Fmax is set (renewed), it sets, as the instructed brake torque Tout, the smaller one of the value of the target brake torque Td and the value (Fmax·Rt+β) obtained based upon the predetermined value β set according to the formula 5 and the latest estimated maximum road friction force Fmax. Specifically, the value (Fmax·Rt+β) is set as the upper limit value of the instructed brake torque Tout. It should be noted that setting the upper limit value of the instructed brake torque Tout to the value (Fmax·Rt+β) means that the slip ratio S of the tire is limited to be not more than the slip ratio Sc at the time when the latest estimated maximum road friction force Fmax is set (renewed). The above description is the outline of the setting of the upper limit value of the instructed brake torque Tout.

[Measure in Case Where Road Surface State Rapidly Changes]

In case where the road surface state rapidly changes, for example, in case where a wet road surface is changed to a dried state, so that the road friction force (road friction coefficient) in the same slip ratio S greatly increases, during when the estimated maximum road friction force Fmax is set (renewed), there may be the case where the torque Ft·Rt based upon the road friction force Ft becomes greater than the instructed brake torque Tout (accordingly, wheel torque Tw). The following problem is caused in case where the road surface state greatly changes as described above.

Considered below is the case where the estimated maximum road friction force Fmax is set to the value Ftamax by the brake pedal operation by a driver during when a vehicle runs on a wet road that causes the maximum road friction force Ftamax with the slip ratio Samax, and the road surface is changed to a dried state that causes a maximum road friction force Ftbmax (>Ftamax) with a slip ratio Sbmax (>Samax) with a state where the estimated maximum road friction force Fmax is set to the value Ftamax.

Figure 5:
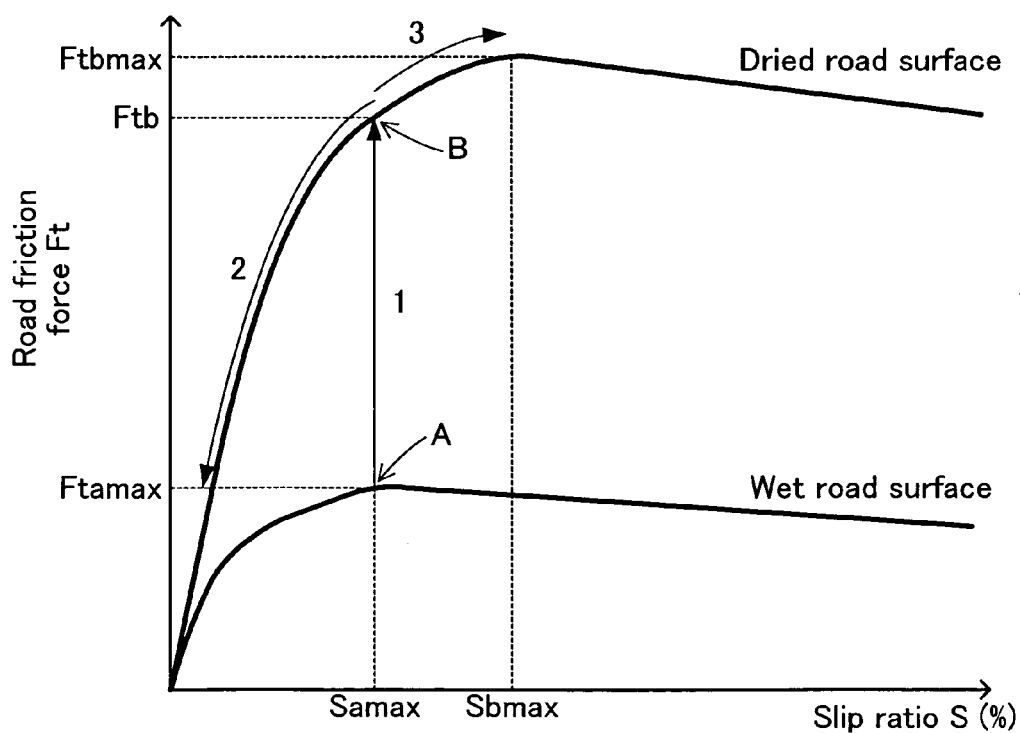
FIG. 5 is a view showing a relationship between a slip ratio of a tire and road friction force as comparing a case of a wet road surface and a case of a dried road surface.

If it is supposed that the instructed brake torque Tout is kept to be the upper limit value (Fmax·Rt+β) at the time when the road surface is changed, the road friction force Ft temporarily rapidly increases from the value Ftamax to the value Ftb (see the movement from a point A to a point B (arrow 1) in FIG. 5) as the slip ratio S is kept to be the value Samax immediately after the road surface is changed, since the slip ratio S at this point is the value Samax. In this case, the road friction force Ft (=Ftb) becomes greater than the estimated maximum road friction force Fmax (=Ftamax), so that the estimated maximum road friction force Fmax can be renewed to the value Ftb at the time when the road surface is changed as described above immediately after the road surface is changed. When the instructed brake torque Tout is kept to be the value (Fmax·Rt+β) even after the road surface is changed, the road friction force Ft becomes temporarily greater than the instructed brake torque Tout (accordingly, wheel torque Tw), whereby the torque in the direction for accelerating the tire is temporarily exerted on the tire. As a result, the slip ratio S rapidly decreases, with which the road friction force Ft falls down to the value (i.e., the value in the vicinity of the value Ftamax) according to the instructed brake torque Tout (accordingly, wheel torque Tw) to thereby be stabilized (see an arrow 2 in FIG. 5).

On the other hand, supposing that the upper limit value of the instructed brake torque (Ftb·Rt+β) is set by using the latest estimated maximum road friction force Fmax (=Ftb) in this case as described above, the slip ratio S is limited to be not more than the value Samax, so that the instructed brake torque Tout cannot be set to a value that exceeds the value Ftb and by which the road friction force Ft can be demonstrated. As a result, the estimated maximum road friction force Fmax cannot reach the maximum road friction force Ftbmax of the dry road surface, whereby the estimated maximum road friction force Fmax is kept to be the value Ftb that is less than the maximum road friction force Ftbmax. Such a problem can arise in case where the road surface state is greatly changed and the slip ratio of the tire by which the maximum road friction force of the road after the change can be demonstrated becomes greater than the slip ratio at the time when the estimated maximum road friction force Fmax is set at the time when (immediately after) the road surface state is changed.

From this viewpoint, this device judges that the above-mentioned problem may arise in case where the torque Ft·Rt based upon the road friction force Ft becomes greater than the wheel torque Tw during when the estimated maximum road friction force Fmax is set (renewed), and releases the setting of the estimated maximum road friction force Fmax. Then, this device calculates the instructed brake torque Tout without setting the upper limit value during when the setting of the estimated maximum road friction force Fmax is released.

This enables to increase the instructed brake torque Tout up to the value that exceeds the value by which the maximum road friction force Ftbmax of the dry road can be demonstrated (see an arrow 3 in FIG. 5). As a result, when the inertia torque Tine exceeds the reference value α, new estimated maximum road friction force Fmax can be set so as to agree with the maximum road friction force Ftbmax of the dry road. It should be noted that this device uses, as temporary estimated maximum road friction force, the value of the estimated maximum road friction force Fmax set immediately before the setting of the estimated maximum road friction force Fmax is released. This will be described later.

[Actual Operation]

Subsequently, the actual operation of the brake torque control device 10 of the present invention having the above-mentioned construction will be explained hereinbelow with reference to FIGS. 6 to 10 showing routines with flowcharts executed by the CPU 51 of the electrical control apparatus 50.

Figure 6:
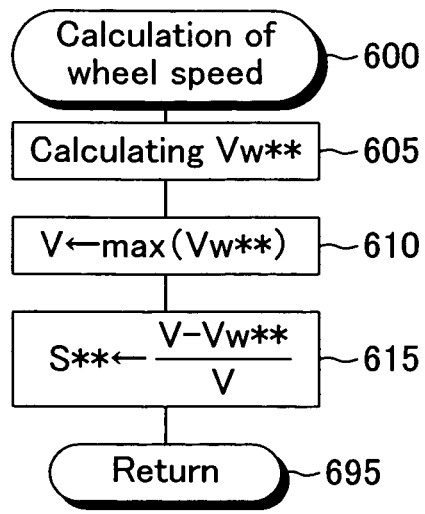
FIG. 6 is a flowchart executed by a CPU shown in FIG. 1 for calculating a wheel speed.

The CPU 51 repeatedly executes a routine shown in FIG. 6 for calculating the wheel speed Vw or the like once every predetermined period. Accordingly, the CPU 51 starts the process from a step 600 at a predetermined timing, and then proceeds to a step 605 to respectively calculate the wheel speed (outer peripheral speed of each wheel) Vw of each wheel FR or the like. Specifically, the CPU 51 calculates the respective wheel speeds Vw of each wheel FR or the like based upon a time interval of a pulse possessed by a signal outputted from each wheel speed sensor 41****.

The symbol "**" marked at the end of the "wheel speed Vw" is a comprehensive expression of "fl", "fr" or the like marked at the end of the wheel speed Vw for showing which wheel such as FR or the like is related to the wheel speed Vw. For example, the wheel speed Vw comprehensively represents the front-left wheel speed Vwfl, front-right wheel speed Vwfr, rear-left wheel speed Vwrl and rear-right wheel speed Vwrr. The mark "**" marked at the end of the other various variables, flags, symbols or the like is the same as mentioned above.

Then, the CPU 51 moves to a step 610 to calculate the maximum value among the wheel speeds Vw of each wheel FR as the body speed V. It is to be noted that the average value of the wheel speeds Vw of each wheel FR or the like may be calculated as the body speed V.

Then, the CPU 51 moves to a step 615 to calculate an actual slip ratio S of every wheel based upon the body speed V calculated at the step 610, the value of the wheel speeds Vw of each wheel FR or the like calculated at the step 605 and the formula described in the step 615 and based upon the right side of the formula 3. Then, the CPU 51 proceeds to a step 695 to temporarily terminate this routine. The CPU 51 repeatedly performs the processes at the steps 600 to 615 after that.

Subsequently explained is a calculation of the necessary control volume G used upon the automatic brake control. The CPU 51 repeatedly executes a routine shown in FIG. 7 once every predetermined period and every wheel. Accordingly, the CPU 51 starts the process from a step 700 at a predetermined timing, and then proceeds to a step 705 to judge whether the automatic brake control is needed or not for a wheel **. This judgement is performed based upon whether the above-mentioned traction control or vehicle stability control is needed or not.

When the automatic brake control for the wheel  is judged to be needed in the judgement at the step 705, the CPU 51 makes "YES" determination at the step 705 to proceed to a step 710 to set a controlled subject flag CONT for the wheel  to "1". The controlled subject flag CONT indicates that the necessary control volume G (≠0) is required to be set for the wheel  when the value thereof is "1", while it indicates that the necessary control volume G (≠0) is not required to be set for the wheel  when the value thereof is "0".

Next, the CPU 51 proceeds to a step 715 to calculate and set the necessary control volume G that should be set for the wheel , and then, moves to a step 795 to temporarily terminate this routine.

On the other hand, when the automatic brake control is judged not to be needed for the wheel  in the judgement at the step 705, the CPU 51 makes "NO" determination at the step 705, and then, proceeds to a step 720 to set the value of the controlled subject flag CONT to "0". After setting the necessary control volume G that should be set for the wheel  to "0" at a step 725, the CPU 51 moves to the step 795 to temporarily terminate this routine. The CPU 51 repeatedly executes the same process after that.

Subsequently explained is a setting and renewal of the estimated maximum road friction force Fmax. The CPU 51 repeatedly executes a routine shown in FIG. 8 once every predetermined period and every wheel. Accordingly, the CPU 51 starts the process from a step 800 at a predetermined timing, and then proceeds to a step 805 to judge whether the brake pedal effort Fp detected by the pedal effort sensor 45 is greater than a non-brake-operation judging reference value F0 (e.g., "0") or not or whether the controlled subject flag CONT for the wheel  is "1" or not.

The explanation is continued supposing that the driver does not operate the brake pedal BP, the automatic brake control is unnecessary for the wheel  and the value of the controlled subject flag CONT is "0" during the vehicle run. The CPU 51 makes "NO" determination at the step 805, and then, proceeds to a step 810 to set the (temporary) estimated maximum road friction force Fmax for the wheel  to a value Fini. Then, the CPU 51 sets the value of a non-setting flag UNSET for the wheel  to "1" at a following step 815.

The non-setting flag UNSET represents that the estimated maximum road friction force Fmax is (substantially) not set (or the setting is released) for the wheel  when the value thereof is "1", while it represents that the estimated maximum road friction force Fmax is (substantially) set for the wheel  when the value thereof is "0". Specifically, the value set as the estimated maximum road friction force Fmax in case where the non-setting flag UNSET is "1" is handled not as the substantial estimated maximum road friction force but as a "temporary" estimated maximum road friction force. Therefore, the estimated road friction force Fmax (=Fini) at present is temporary estimated maximum road friction force for the wheel **. Further, the value Fini is a value corresponding to road friction force that is great to a degree that it cannot be generated in the combination of a normal road surface and a normal tire.

Then, the CPU 51 immediately proceeds to a step 870 to set the value of the wheel torque Tw of the wheel  detected by the wheel torque sensor 42* for the wheel  at present as the previous wheel torque Twb for the wheel , and thereafter, it proceeds to a step 895 to temporarily terminate this routine. After that, the CPU 51 repeatedly execute a series of processes at steps 800 to 815 and 870 so long as the driver does not operate the brake pedal BP and the automatic brake control is unnecessary for the wheel .

Subsequently explained is a calculation of the instructed brake torque Tout. The CPU 51 repeatedly executes a routine shown in FIG. 9 once every predetermined period and every wheel. Accordingly, the CPU 51 starts the process from a step 900 at a predetermined timing, and then proceeds to a step 905 to make the same determination as the step 805 described above.

In this stage, the driver does not operate the brake pedal BP and the automatic brake control is unnecessary for the wheel , so that the CPU 51 makes "NO" determination at the step 905, and then, moves to a step 910 to set the value of the instructed brake torque Tout for the wheel  to "0". Thereafter, the CPU 51 moves to a step 995** to temporarily terminate this routine.

After that, the CPU 51 repeatedly executes a series of processes at steps 900 to 910 so long as the driver does not operate the brake pedal BP and the automatic brake control is unnecessary for the wheel **.

Subsequently explained is a brake torque control. The CPU 51 repeatedly executes a routine shown in FIG. 10 once every predetermined period and every wheel. Accordingly, the CPU 51 starts the process from a step 1000 at a predetermined timing, and then proceeds to a step 1005 to set instructed brake hydraulic pressure Pout** for the wheel based upon the value of the instructed brake torque Tout for the latest wheel ** set in the process at the step 910 (or in a process at a step 935 described later) in FIG. 9 and the table described in the step 1005.

This allows to set the instructed brake hydraulic pressure Pout so as to be in proportion to the value of the instructed brake torque Tout. Since the value of the instructed brake torque Tout** is "0" at present, the instructed brake hydraulic pressure is also set to "0".

Subsequently, the CPU 51 moves to a step 1010 to set, as a brake hydraulic pressure deviation ΔP for the wheel , a value obtained by subtracting the actual brake hydraulic pressure Pw for the wheel  detected by the brake hydraulic sensor 46 for the wheel  from the instructed brake hydraulic pressure Pout for the wheel .

Then, the CPU 51 proceeds to a step 1015 to set a hydraulic control mode for the wheel . Specifically, the CPU 51 sets the hydraulic control mode to "pressure-up" when the value of the brake fluid pressure deviation ΔP exceeds the predetermined positive reference value, sets the hydraulic control mode to "keep" when the value of the brake fluid pressure deviation ΔP is not less than the predetermined negative reference value but not more than the predetermined positive reference value, and sets the hydraulic control mode to "pressure-down" when the value of the brake fluid pressure deviation ΔP is less than the predetermined negative reference value, based upon the value of the brake fluid pressure deviation ΔP for the wheel  calculated at the step 1010 and the table disclosed in the step 1015.

Subsequently, the CPU 51 proceeds to a step 1020 where it controls the pressure increasing valve PU and pressure reducing valve PD according to the hydraulic control mode for the wheel ** set at the step 1015.

Specifically, the CPU 51 controls to set the corresponding pressure increasing valve PU and pressure reducing valve PD to the first position (position in the non-actuated state) in case where the hydraulic control mode for the wheel  is "pressure-up", while it controls to set the corresponding pressure increasing valve PU to the second position (position in the actuated state) and the corresponding pressure reducing valve PD to the first position in case where the hydraulic control mode for the wheel  is "keep", and further it controls to set the corresponding pressure increasing valve PU and pressure reducing valve PD to the second position (position in the actuated state) in case where the hydraulic control mode for the wheel ** is "pressure-down".

This operation causes to increase the brake fluid pressure in the wheel cylinder W of the wheel  in case where the hydraulic control mode is "pressure-up", while to decrease the brake fluid pressure in the wheel cylinder W of the wheel  in case where the hydraulic control mode is "pressure-down", whereby it is controlled such that the brake fluid pressure Pw for the wheel  approaches the instructed brake fluid pressure Pout. The brake fluid pressure Pw is controlled to be "0" at present. Consequently, the brake torque control for the wheel  according to the latest instructed brake torque Tout (accordingly, the instructed brake fluid pressure Pout**) set in the routine in FIG. 9 can be achieved.

Subsequently explained is the case where, from this state (the driver does not operate the brake pedal BP and the automatic brake control is unnecessary for the wheel **), the driver starts to operate the brake pedal BP to gradually increase the value of the brake pedal effort Fp from "0".

Supposing that the present point is immediately after the value of the brake pedal effort Fp exceeds the non-brake operation judging reference value F0. The CPU 51 repeatedly executing a series of processes at steps 800 to 815 and 870 in FIG. 8 makes "YES" determination when proceeding to the step 805, and then, moves to the step 820.

Moving to the step 820, the CPU 51 calculates the inertia torque Tine for the wheel  based upon the value of the wheel torque Tw for the wheel  detected by the wheel torque sensor 42, the value of the road friction force Ft for the wheel  detected by the road friction force sensor 43 and the formula described in the step 820 and corresponding to the above formula 1.

Then, the CPU 51 proceeds to a step 825 to set, as wheel torque deviation ΔTw for the wheel , a value obtained by subtracting the last-time wheel torque Twb set at the process at the step 870 during the execution of the last-time this routine from the wheel torque Tw used for the process at the step 820.

Then, the CPU 51 proceeds to a step 830 to set, as wheel torque increasing speed dTw/dt for the wheel , the value obtained by dividing the wheel torque deviation ΔTw by the operation period Δt of this routine. Subsequently, the CPU 51 proceeds to a step 835 to calculate a reference value α for the wheel  based upon the value of the body deceleration dV/dt detected by the body deceleration sensor 44, the value of the wheel torque increasing speed dTw/dt set at the step 830 and the formula corresponding to the above formula 2 and described in the step 835.

Then, the CPU 51 moves to a step 840 to judge whether or not the road friction force Ft is greater than the (temporary) estimated maximum road friction force Fmax set at present, or whether or not the inertia torque Tine calculated at the step 820 is greater than the reference value α calculated at the step 835.

At present, the temporary estimated maximum road friction force Fmax is set to the value Fini that is great enough. Further, the present point is immediately after the brake pedal effort Fp exceeds the non-brake operation judging reference value F0, so that the slip ratio S of the wheel  does not exceed the value by which the maximum road friction force can be demonstrated. Therefore, the inertia torque Tine  does not exceed the reference value α**. Accordingly, the CPU 51 makes "NO" determination at the step 840 to immediately proceed to a step 860.

Moving to the step 860, the CPU 51 judges whether the value of the torque Ft ·Rt based upon the road friction force Ft is greater than the wheel torque Tw or not. Since the value of the torque Ft·Rt is less than the wheel torque Tw at present, the CPU 51 makes "NO" determination at the step 860, and then, immediately proceeds to a step 870 to set the wheel torque Tw as the last-time wheel torque Twb**. Thereafter, the CPU 51 proceeds to a step 895 to temporarily terminate this routine.

After that, the CPU 51 repeatedly executes a series of processes at steps 800, 805, 820 to 840, 860 and 870 so long as the slip ratio S for the wheel  does not exceed the value by which the maximum road friction force can be demonstrated (i.e., so long as "YES" determination is not made at the step 840).

Similarly, supposing that the present point is immediately after the brake pedal effort Fp exceeds the non-brake operation judging reference value F0. The CPU 51 repeatedly executing a series of processes at steps 900 to 910 in FIG. 9 makes "YES" determination when moving to a step 905, and then, proceeds to a step 915.

Figure 7:
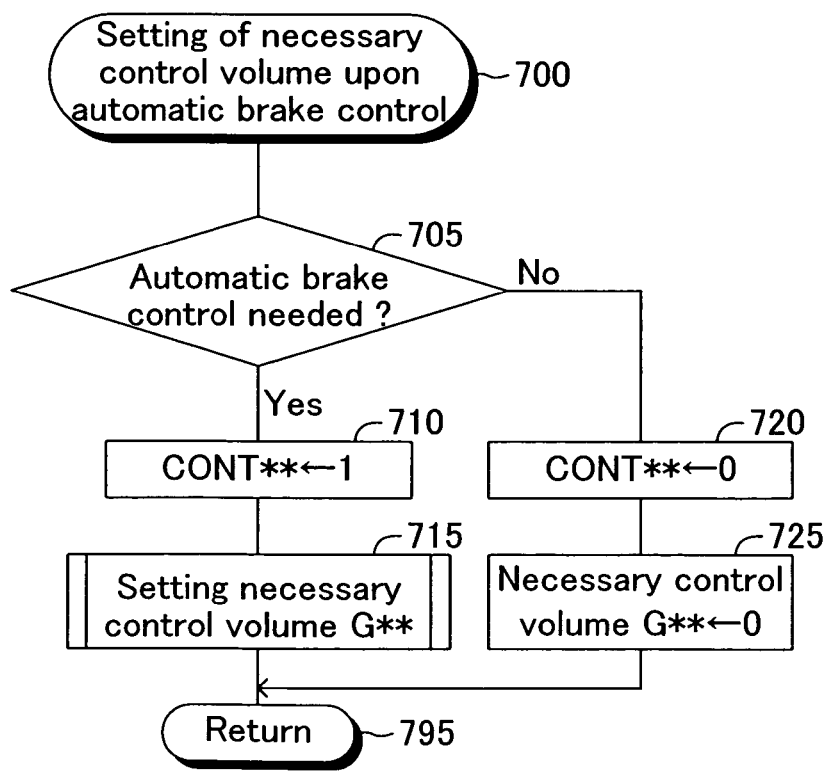
FIG. 7 is a flowchart executed by a CPU shown in FIG. 1 for setting necessary control volume upon an automatic brake control.

Moving to the step 915, the CPU 51 calculates the target brake torque Td for the wheel  based upon the value of the brake pedal effort Fp detected by the pedal effort sensor 45, the value of the latest necessary control volume G for the wheel  set by the process in the step 725 (or by the process in the step 715) in FIG. 7 (at present, it is "0") and the function g described in the step 915.

Subsequently, the CPU 51 proceeds to a step 920 to calculate a predetermined value β for the wheel  based upon the value of the body deceleration dV/dt detected by the body deceleration sensor 44, the value of the slip ratio Sc upon setting the latest estimated maximum road friction force, described later, for the wheel  and the formula corresponding to the above formula 5 and described in the step 920.

Then, the CPU 51 proceeds to a step 925 to judge whether the value of the non-setting flag UNSET is "1" or not. At present, the value of the non-setting flag UNSET is "1" by the process at the previous step 815 in FIG. 8. Therefore, the CPU 51 makes "YES" determination at the step 925, and then, moves to a step 930 to set, as new temporary estimated maximum road friction force Fmax, the greater value of the temporary estimated maximum road friction force Fmax at present and a value obtained by dividing a value, that is obtained by adding the latest wheel torque deviation ΔTw set by the process at the previous step 825 in FIG. 8 to the wheel torque Tw at present, by the radius of the tire Rt.

Since the temporary estimated maximum road friction force Fmax is the value Fini that is great enough at present, the temporary estimated maximum road friction force Fmax is not renewed, and hence, it is kept to be the value Fini.

Then, the CPU 51 moves to the step 935 to set, as the instructed brake torque Tout for the wheel , the smaller value of the target brake torque Td set by the process at the step 915 and the value (Fmax·Rt+β) based upon the value of the (temporary) estimated maximum road friction force Fmax set by the process at the step 930 and the predetermined value β calculated by the process at the step 920. Thereafter, the CPU 51 proceeds to a step 955 to temporarily terminate this routine. The temporary estimated maximum road friction force Fmax is sufficiently great at present, so that the instructed brake torque Tout becomes equal to the target brake torque Td.

Figure 8:
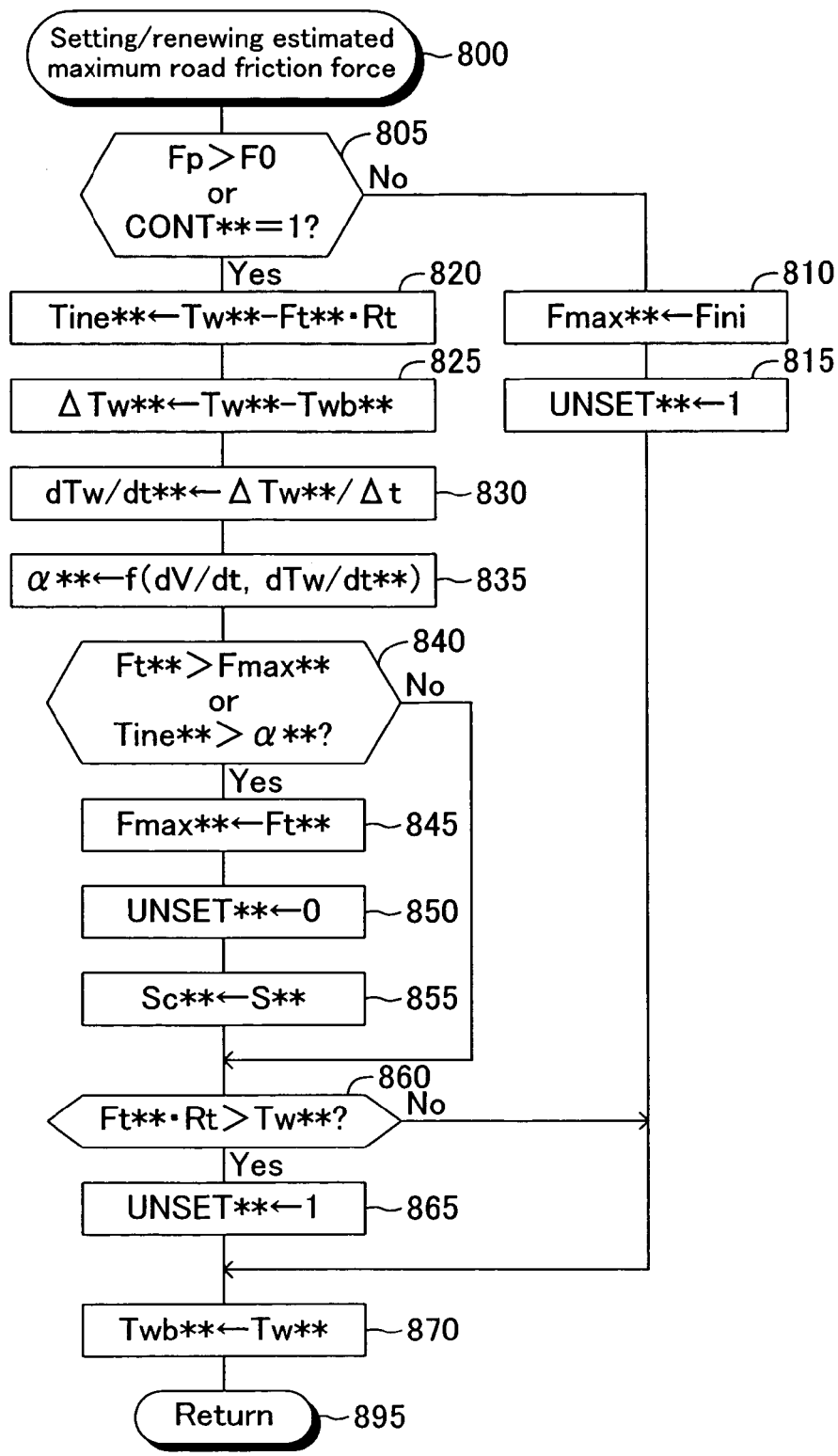
FIG. 8 is a flowchart executed by a CPU shown in FIG. 1 for setting and renewing estimated maximum road friction force.

After that, the CPU 51 repeatedly executes a series of processes at steps 900, 905 and 910 to 935 so long as the slip ratio S for the wheel  does not exceed the value by which the maximum road friction force can be demonstrated (i.e., so long as "YES" determination is not made at the step 840 in FIG. 8). This allows to increase the instructed brake torque Tout with the increase of the brake pedal effort Fp, resulting in that the brake fluid pressure Pw for the wheel ** increases with the increase of the brake pedal effort Fp due to the repeated execution of the routine in FIG. 10.

Subsequently explained is the case where a predetermined time has elapsed from this state and the value of the brake pedal effort Fp increases up to such a degree that the slip ratio S of the wheel  exceeds the value by which the maximum estimated road friction force can be demonstrated (i.e., in case where the inertia torque Tine exceeds the reference value α).

Supposing that the present point is immediately after the slip ratio S of the wheel  exceeds the value by which the maximum road friction force can be demonstrated. The CPU 51 repeatedly executing a series of processes at steps 800, 805, 820 to 840, 860 and 870 in FIG. 8 makes "YES" determination when proceeding to the step 840, and then, moves to the step 845.

Moving to the step 845, the CPU 51 sets (for the first time) the value of the road friction force Ft detected by the road friction force sensor 43 at present as the (substantial) estimated maximum road friction force Fmax, and then, at the nest step 850, it changes the non-setting flag UNSET from "0" to "1". Further, at the next step 855, it sets the latest slip ratio S calculated by the process at the step 615 in FIG. 6 at present as the slip ratio Sc upon setting the latest estimated maximum road friction force for the wheel **.

Then, the CPU 51 makes "NO" determination in the judgement at the step 860, and then, proceeds immediately to a step 870 to set the value of the wheel torque Tw as the last-time wheel torque Twb. Thereafter, the CPU 51 proceeds to the step 895 to temporarily terminate this routine.

After that, the CPU 51 repeatedly executes a series of processes at steps 800, 805, 820 to 840, 860 and 870 so long as the "YES" determination is not made at the step 840, thereby keeping the value of the estimated maximum road friction force Fmax constant with the value of the non-setting flag UNSET kept to be "0". On the other hand, in the case of "YES" determination at the step 840, i.e., in case where the road friction coefficient slightly increases due to a slight change in the road surface state so that the road friction force Ft becomes greater than the estimated maximum road friction force Fmax, or in case where the road friction coefficient decreases due to a change in the road surface state so that the inertia torque Tine becomes greater again than the reference value α, the CPU 51 repeatedly executes a series of processes at steps 800, 805, 820 to 860 and 870, thereby suitably increasing or decreasing (renewing) the value of the estimated maximum road friction force Fmax with the non-setting flag UNSET kept to be "0".

Figure 9:
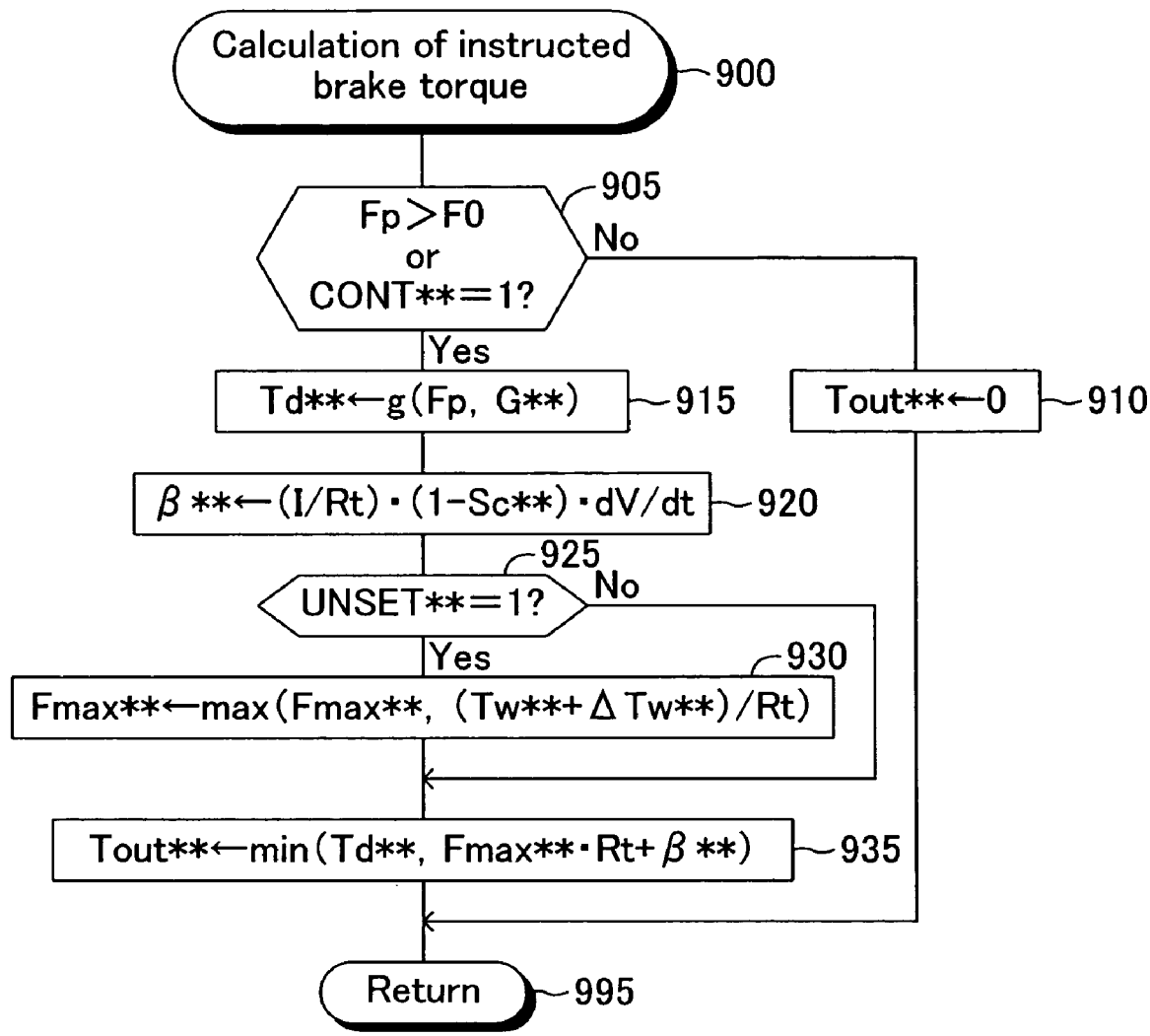
FIG. 9 is a flowchart executed by a CPU shown in FIG. 1 for calculating instructed brake torque.
Figure 10:
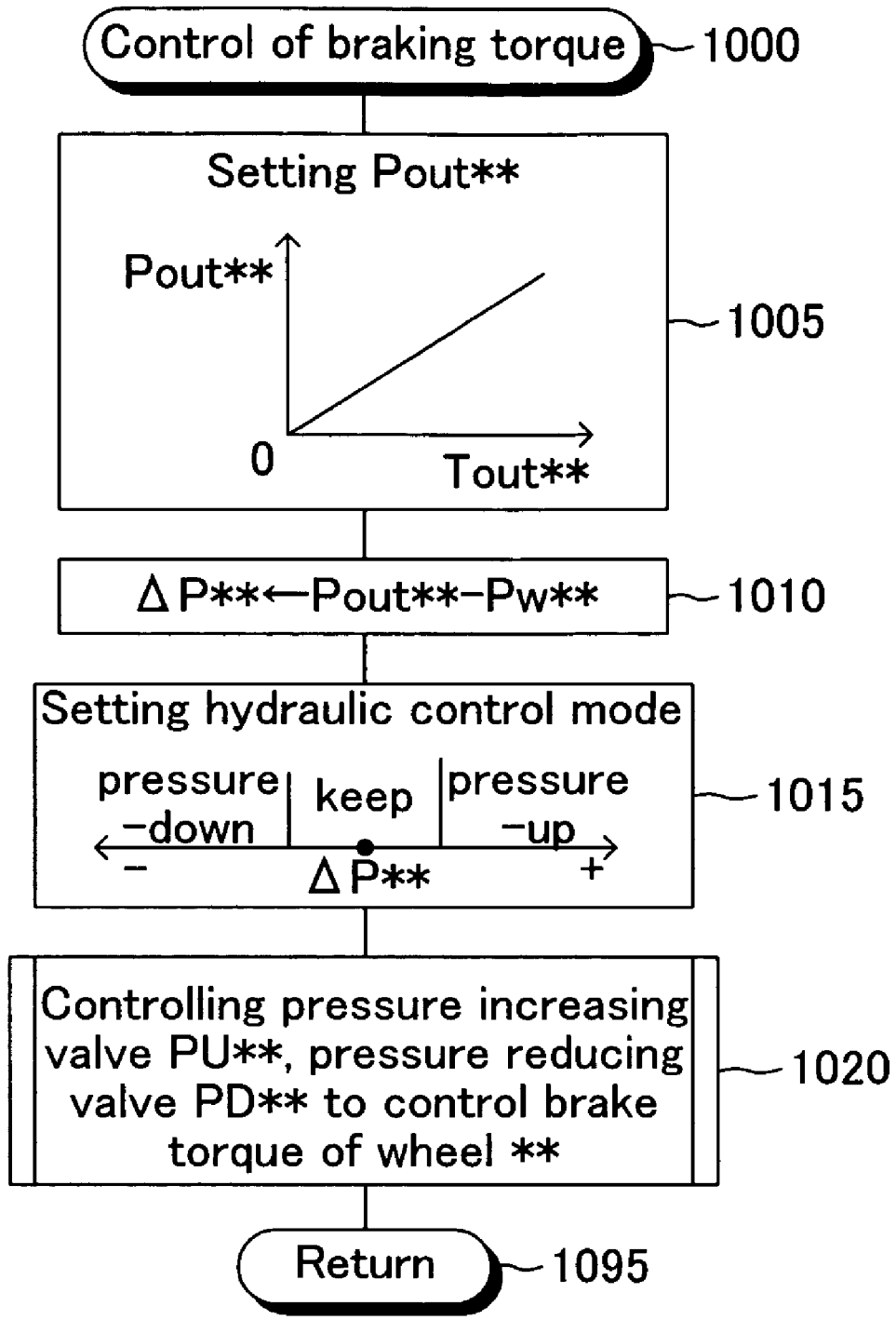
FIG. 10 is a flowchart executed by a CPU shown in FIG. 1 for executing a brake torque control.

When the value of the non-setting flag UNSET** is set or kept to be "0" as described above, the CPU 51 repeatedly executing a series of processes at steps 900, 905 and 915 to 935 in FIG. 9 makes "NO" determination when moving to the step 925, and then, proceeds immediately to a step 935 not to execute the process at the step 930.

Specifically, in the process at the step 935, the value (Fmax·Rt+β) based upon the value of the (substantial) estimated maximum road friction force Fmax set and renewed by the routine in FIG. 8 and the predetermined value β calculated by the process at the step 920 is set as the upper limit value of the instructed brake torque Tout for the wheel .

After that, the CPU 51 repeatedly executes a series of processes at steps 900, 905, 915 to 925 and 935 so long as the non-setting flag UNSET** is kept to be "0" (i.e., so long as the "NO" determination is not made at the step 805 in FIG. 8, or so long as the "YES" determination is not made at a step 860 described later).

This limits the instructed brake torque Tout to the upper limit value (Fmax·Rt+β) even though the brake pedal effort Fp further increases. As a result, the brake fluid pressure Pw for the wheel  (accordingly, the actual brake torque exerted on the wheel ) is controlled such that the actual slip ratio S for the wheel  is kept to be the slip ratio Sc upon setting the latest estimated maximum road friction force (i.e., the road friction force Ft is kept to be the estimated maximum road friction force Fmax) in spite of the further increase in the brake pedal effort Fp.

Subsequently explained is the case where the road surface state is rapidly changed from this state, and hence the road friction force Ft in the same slip ratio S greatly increases, i.e., the case where the torque Ft·Rt based upon the road friction force Ft becomes greater than the wheel torque Tw.

In this case, the CPU 51 repeatedly executing the routine in FIG. 8 makes "YES" determination when moving to the step 860, and then, proceeds to a step 865. Moving to the step 865, the CPU 51 changes the value of the non-setting flag UNSET to "1" from "0". This allows to release the setting of the substantial estimated maximum road friction force Fmax, whereby the value of the estimated maximum road friction force Fmax renewed by the process at the step 845 immediately after the rapid change in the road surface state (i.e., the value of the greatly increasing road friction force Ft) is handled as the temporary estimated maximum road friction force Fmax**.

With this change of the value of the non-setting flag UNSET from "0" to "1", the CPU 51 repeatedly executing a series of processes at steps 900, 905, 915 to 925 and 935 makes "YES" determination when moving to a step 925, and then, executes again the above-mentioned process at the step 930**.

This brings that the upper limit value of the instructed brake torque Tout is substantially not set. Specifically, the temporary estimated maximum road friction force Fmax is at first kept, by the process at the step 930, to be the above-mentioned greatly increasing road friction force Ft that is the value of the temporary estimated maximum road friction force Fmax at present, resulting in that the value of the instructed brake torque Tout can be set to a value greater than the set upper limit value by the process at the step 935**.

As a result, further increasing the brake pedal effort Fp can further increase the brake fluid pressure Pw (accordingly, the wheel torque Tw). When the value (Tw+ΔTw)/Rt becomes greater than the kept estimated maximum road friction force Fmax with this, this value is renewed one after another to the value (Tw+ΔTw)/Rt by which the temporary estimated maximum road friction force Fmax can gradually increase by the process at the step 930. As a result, the instructed brake torque Tout is set to a further greater value by the process at the step 935. The instructed brake torque Tout can endlessly increase with a speed according to the wheel torque deviation ΔTw** by the repeated execution of these processes.

When the slip ratio S for the wheel  exceeds the value by which the maximum road friction force of a new road surface can be demonstrated with the increase in the wheel torque Tw, the inertia torque Tine exceeds the reference value α. Therefore, the CPU 51 makes "YES" determination again when moving to the step 840 in FIG. 8 for resetting the value of the road friction force Ft at this point as new substantial estimated maximum road friction force Fmax and changing the value of the non-setting flag UNSET to "0" from "1". As a result, the value (Fmax·Rt+β) based upon the estimated maximum road friction force Fmax set and renewed by the routine in FIG. 8 is again set as the upper limit value of the instructed brake torque Tout after that, so long as the value of the non-setting flag UNSET** is kept to be "0".

In this way, the estimated maximum road friction force Fmax and the upper limit value of the instructed brake torque Tout are set and renewed for every wheel. When the driver finishes the brake pedal operation from this state and hence the brake pedal effort Fp becomes "0" (and when the automatic brake control for the wheel  is unnecessary (accordingly, CONT=0)), the CPU 51 makes "NO" determination at the step 805 in FIG. 8, thereby changing the value of the non-setting flag to "1" from "0". As a result, the setting of the estimated maximum road friction force Fmax is released (the temporary estimated maximum road friction force Fmax is set to the value Fini) and the setting of the upper limit value of the instructed brake torque Tout** is also released.

As explained above, the brake torque control device including the maximum road friction force estimating device of the present invention can accurately estimate maximum road friction force (estimated maximum road friction force Fmax) only by judging that the inertia torque Tine exceeds the reference value α. Further, the set estimated maximum road friction force Fmax is suitably increased or decreased (renewed) according to the change in the road surface state afterwards, whereby the maximum road friction force that can change moment by moment according to the road surface state can more accurately and surely be estimated.

Moreover, the instructed brake torque Tout is calculated under the condition that the upper limit value of the instructed brake torque Tout is set based upon this set and renewed estimated maximum road friction force Fmax, whereby the upper limit value of the instructed brake torque Tout, accordingly the target value of the instructed brake torque Tout upon executing the ABS control can clearly be set as one value. Therefore, in case where the brake torque is controlled by increasing or decreasing the brake fluid pressure, the pressure-increasing control and pressure-reducing control of the brake fluid pressure can more accurately be executed, resulting in avoiding that surplus pressure reduction of the brake fluid pressure is greatly performed.

Accordingly, the brake torque control device including the maximum road friction force estimating device of the present invention can effectively shorten a braking distance if it is applied to a vehicle having mounted thereto a tire having a maximum friction coefficient (maximum road friction force) that is greater than that of a normal tire and having a characteristic that the friction coefficient (friction force) rapidly decreases as the slip ratio is apart from the slip ratio by which the maximum friction force can be demonstrated.

The present invention is not limited to the above-mentioned embodiment, but various modifications can be applied within the scope of the invention. For example, the aforesaid embodiment is configured such that the setting of the estimated maximum road friction force Fmax is released when the torque Ft·Rt exceeds the wheel torque Tw (see step 860). However, it may be configured such that the the setting of the estimated maximum road friction force Fmax is released when the torque Ft·Rt exceeds the instructed brake torque Tout.

Further, although the inertia torque Tine is calculated based upon the wheel torque Tw and the road friction force Ft (see step 820), the inertia torque Tine may be calculated by multiplying the wheel angular acceleration (accordingly, the angular acceleration of a tire) dω/dt that is a time derivative value of the wheel angular speed ω obtained from the wheel speed sensor by the moment of inertia I.

Moreover, the above-mentioned embodiment is configured such that the body deceleration dV/dt is physically directly detected by the body deceleration sensor to be obtained. However, in case where the vehicle is provided with a vehicle mass sensor for detecting a mass M of the vehicle, it may be configured such that a value obtained by subtracting a total sum $\Sigma Ft^{}$ of the road friction force $Ft^{}$ of each wheel by the vehicle mass m is calculated as the body deceleration dV/dt.

Further, although the reference value α is set according to the increasing speed dTw/dt of the wheel torque in the above-mentioned embodiment (see step 835), the reference value α may be set according to the increasing speed of the road friction force Ft or the increasing speed of the instructed brake torque Tout.

Moreover, although the instructed brake torque Tout can increase with the speed according to the value of the wheel torque deviation $\Delta Tw^{}$ during when the estimated maximum road friction force Fmax is substantially not set (i.e., during when the temporary estimated maximum road friction force Fmax is set) (see step 930**) in the above-mentioned embodiment, it may be configured such that the instructed brake torque Tout can increase according to the target brake torque Td.

Further, the above-mentioned embodiment is configured such that the predetermined value β used upon setting the upper limit value of the instructed brake torque Tout is set based upon the body deceleration dV/dt and the slip ratio Sc of a tire at the time when the latest estimated maximum road friction force Fmax is set (renewed), in order to give the highest priority to a scheme for shortening the braking distance (see step 920). However, in case where the stability of the vehicle takes priority over the scheme for shortening the braking distance, the predetermined value β may be set to a value smaller than the value calculated at the step 920 according to a degree of giving priority to the stability of the vehicle.

Moreover, in the above-mentioned embodiment, the brake hydraulic control device 30 has a configuration to control each wheel cylinder fluid pressure according to the brake pedal effort with the master cylinder MC and each wheel cylinder W always closed, so long as it is normal. However, it may be configured such that the master cylinder MC and each wheel cylinder W communicate with each other during only when the automatic brake control is unnecessary (i.e., the necessary control volume G is "0") and the instructed brake torque Tout is set according only to the brake pedal effort Fp.

Further, although the above-mentioned embodiment is configured such that the estimated maximum road friction force Fmax is set upon the brake operation, the estimated maximum road friction force Ft can similarly be set for a driving wheel upon the acceleration by setting each sign of the angular acceleration of the tire dω/dt, wheel torque Tw and road friction force Ft so as to reverse to that upon the brake operation. Accordingly, the above-mentioned embodiment can be applied to a driving control such as a well-known traction control or the like.

What is claimed is:

1. A maximum road friction force estimating device comprising:
   road friction force obtaining means for obtaining, as road friction force, friction force caused between a road surface on which a vehicle runs and a tire of the vehicle;
   angular acceleration correspondence value obtaining means for obtaining an angular acceleration correspondence value, the angular acceleration correspondence value being a value based upon an angular acceleration of the tire and a value corresponding to a difference between a torque obtained by converting the road friction force into torque exerted on the tire and a brake torque exerted on the tire in order to brake the tire, wherein a slip ratio of the tire changes in accordance with a change of the angular acceleration correspondence value;
   body deceleration obtaining means for obtaining deceleration exerted on the vehicle in a front-to-rear direction of the vehicle body as a body deceleration;
   determining means for determining a predetermined reference value that is the angular acceleration correspondence value corresponding to a case where the slip ratio of the tire exceeds a value by which a maximum value of the road friction force is demonstrated, the determining means being configured to increase the predetermined reference value in accordance with an increase in the obtained body deceleration;
   comparing means for comparing the angular acceleration correspondence value obtained by the angular acceleration correspondence value obtaining means with the predetermined reference value; and
   estimated maximum road friction force setting means for setting the road friction force obtained by the road friction force obtaining means as estimated maximum road friction force when the comparing means determines that the angular acceleration correspondence value obtained by the angular acceleration correspondence value obtaining means exceeds the predetermined reference value.

2. A maximum road friction force estimating device claimed in claim 1, wherein, in case where the estimated maximum road friction force is already set, the estimated maximum road friction force setting means is configured to set the obtained road friction force as new estimated maximum road friction force when the obtained road friction force exceeds the set estimated maximum road friction force and/or when the obtained angular acceleration correspondence value exceeds the reference value.

3. A maximum road friction force estimating device claimed in claim 1, further comprising wheel torque obtaining means that obtains torque generated on an axle corresponding to the above-mentioned tire as wheel torque, wherein the angular acceleration correspondence value obtaining means is configured to calculate the angular acceleration correspondence value based upon the obtained wheel torque and the obtained road friction force.

4. A maximum road friction force estimating device claimed in claim 3, wherein the determining means is configured to obtain an increasing speed of at least one of the obtained wheel torque and the obtained road friction force and to change the reference value according to the increasing speed.

5. A maximum road friction force estimating device claimed in claim 1, further comprising wheel angular speed obtaining means that obtains a wheel angular speed of a wheel to which the tire is mounted, wherein the angular acceleration correspondence value obtaining means is configured to calculate the angular acceleration correspondence value based upon the obtained wheel angular speed.

6. A maximum road friction force estimating device claimed in claim 5, wherein the determining means is configured to obtain an increasing speed of the obtained road friction force and to change the reference value according to the increasing speed.

7. A brake torque control device applied to a vehicle provided with the maximum road friction force estimating device claimed in claim 1, comprising:
   brake torque control means that calculates instructed brake torque according to a state of a vehicle and controls an actual brake torque exerted on the tire so as to become the instructed brake torque in order to brake the tire, wherein the brake torque control means is configured to calculate the instructed brake torque under a condition that a value, that is obtained by adding a predetermined value to a value that is obtained by converting the estimated maximum road friction force into torque exerted on the tire, is set as an upper limit value of the instructed brake torque, during when the estimated maximum road friction force is set by the maximum road friction force estimating device.

8. A brake torque control device claimed in claim 7, wherein the brake torque control means is configured to change the predetermined value according to the obtained body deceleration.

9. A brake torque control device claimed in claim 7, wherein the brake torque control means is configured to release a setting of the estimated maximum road friction force by the maximum road friction force estimating device when a value obtained by converting the road friction force, obtained by the road friction force obtaining means in the maximum road friction force estimating device, into torque exerted on the tire is greater than at least one of the calculated instructed brake torque and the obtained wheel torque, and to calculate the instructed brake torque without setting the upper limit value during when the estimated maximum road friction force is not set by the maximum road friction force estimating device.

10. A brake torque control device claimed in claim 7, wherein the brake torque control means is configured to obtain an increasing speed of the calculated instructed brake torque and to change the reference value, that is used by the estimated maximum road friction force setting means of the maximum road friction force estimating device, according to the increasing speed.

11. A maximum road friction force estimating device claimed in claim 1, wherein the estimated maximum road friction force setting means does not set the road friction force obtained by the road friction force obtaining means as the estimated maximum road friction force when the comparing means determines that the angular acceleration correspondence value obtained by the angular acceleration correspondence value obtaining means is less than the predetermined reference value.

* * * * *